United States Patent
Takagawa et al.

(10) Patent No.: US 9,221,604 B2
(45) Date of Patent: Dec. 29, 2015

(54) ARTICLE STORAGE FACILITY AND METHOD OF OPERATION THEREFOR

(75) Inventors: Natsuo Takagawa, Yasu (JP); Masayuki Uchida, Ritto (JP)

(73) Assignee: Daifuku Co., Ltd., Osaka (JP)

( * ) Notice: Subject to any disclaimer, the term of this patent is extended or adjusted under 35 U.S.C. 154(b) by 778 days.

(21) Appl. No.: 13/062,126

(22) PCT Filed: Jul. 24, 2009

(86) PCT No.: PCT/JP2009/063251
§ 371 (c)(1),
(2), (4) Date: May 25, 2011

(87) PCT Pub. No.: WO2010/026842
PCT Pub. Date: Mar. 11, 2010

(65) Prior Publication Data
US 2011/0276175 A1  Nov. 10, 2011

(30) Foreign Application Priority Data

Sep. 5, 2008 (JP) ................. 2008-228866
Sep. 5, 2008 (JP) ................. 2008-228867

(51) Int. Cl.
*G06F 7/00* (2006.01)
*B65G 1/04* (2006.01)

(52) U.S. Cl.
CPC ............ *B65G 1/0407* (2013.01); *B65G 1/0421* (2013.01)

(58) Field of Classification Search
USPC .......... 700/273, 277, 281, 218; 901/1; 3/273, 3/277, 281
See application file for complete search history.

(56) References Cited

U.S. PATENT DOCUMENTS 2,840,187 A    6/1958   Bianca
3,746,189 A    7/1973   Burch et al.
(Continued)

FOREIGN PATENT DOCUMENTS

DE    1044712      11/1958
DE    3533063 A1    3/1987
(Continued)

OTHER PUBLICATIONS

Pobil, et al., "A New Representation for Collision Avoidance and Detection", IEEE 1992, pp. 246-251.*
(Continued)

*Primary Examiner* — Gene Crawford
*Assistant Examiner* — Lester Rushin
(74) *Attorney, Agent, or Firm* — The Webb Law Firm

(57) ABSTRACT

Disclosed is an article storage facility which can be downsized by minimizing the width of the travel path for a pair of stacker cranes, in which its configuration is simplified as much as possible, and in which its throughput can be efficiently improved. The control device is configured to perform a mutual avoidance vertical movement process in which a pair of vertically movable bodies are raised or lowered by a vertical movement operation for avoiding interference, which is different from the vertical movement operation in the article transporting operation to raise and lower the pair of vertically movable bodies, to the vertical positions for passing each other which are spaced apart in the vertical movement direction by a distance greater than or equal to the required separating distance which is defined as a separating distance which allows the pair of stacker cranes to pass each other without interfering.

21 Claims, 16 Drawing Sheets

(56) References Cited

U.S. PATENT DOCUMENTS

| | | | |
|---|---|---|---|
| 3,792,758 | A | 2/1974 | Wentz |
| 4,113,119 | A | 9/1978 | Brown et al. |
| 4,466,765 | A | 8/1984 | Mautino |
| 5,226,782 | A | 7/1993 | Rigling |
| 6,042,322 | A | 3/2000 | Piccini |
| 6,065,619 | A | 5/2000 | Miyata et al. |
| 6,678,582 | B2* | 1/2004 | Waled .................. 700/245 |
| 7,257,463 | B2 | 8/2007 | Taguchi et al. |
| 7,575,407 | B2* | 8/2009 | Tsujimoto ............. 414/279 |
| 7,949,423 | B2* | 5/2011 | Tsukamoto ........... 700/214 |
| 8,162,585 | B2 | 4/2012 | Tsujimoto et al. |
| 2004/0228709 | A1 | 11/2004 | Ueda |
| 2004/0228710 | A1 | 11/2004 | Ueda |
| 2004/0254674 | A1* | 12/2004 | Nojo et al. ............. 700/213 |
| 2005/0053450 | A1 | 3/2005 | Kantola et al. |
| 2005/0245101 | A1* | 11/2005 | Brill et al. ............. 438/800 |
| 2006/0182536 | A1* | 8/2006 | Rice et al. ............. 414/217 |
| 2006/0182550 | A1 | 8/2006 | Lee |
| 2006/0276930 | A1* | 12/2006 | Tsujimoto et al. ..... 700/214 |
| 2007/0032903 | A1 | 2/2007 | Tsujimoto |
| 2008/0051930 | A1* | 2/2008 | Oh et al. ............... 700/214 |
| 2008/0051931 | A1* | 2/2008 | Ishida ................... 700/215 |
| 2008/0053941 | A1* | 3/2008 | Tsukamoto ............ 211/134 |
| 2008/0147306 | A1 | 6/2008 | Hayashi |
| 2009/0028675 | A1* | 1/2009 | Tsujimoto et al. ..... 414/273 |
| 2012/0070255 | A1 | 3/2012 | Tsujimoto et al. |

FOREIGN PATENT DOCUMENTS

| | | |
|---|---|---|
| DE | 4238322 A1 | 5/1994 |
| DE | 4242811 A1 | 6/1994 |
| EP | 0608689 B1 | 3/1997 |
| EP | 1897839 A2 | 3/2008 |
| GB | 2264292 A | 8/1993 |
| JP | 63315491 A | 12/1988 |
| JP | 6293404 A | 10/1994 |
| JP | 06305514 | 11/1994 |
| JP | 07125810 | 5/1995 |
| JP | 10167666 A | 6/1998 |
| JP | 1159819 A | 3/1999 |
| JP | 2000351411 A | 12/2000 |
| JP | 2001163408 A | 6/2001 |
| JP | 2002175117 A | 6/2002 |
| JP | 2004106945 A | 4/2004 |
| JP | 200553642 A | 3/2005 |
| JP | 2007015780 | 1/2007 |
| JP | 2007126258 | 5/2007 |
| JP | 2007137599 A | 6/2007 |
| JP | 2007323112 A | 12/2007 |
| JP | 2008150135 A | 7/2008 |

OTHER PUBLICATIONS

Pobil et al., "A New Representation for Collision Avoidance and Detection", IEEE 1992, pp. 246-251.*

* cited by examiner

ARTICLE STORAGE FACILITY AND METHOD OF OPERATION THEREFOR

TECHNICAL FIELD

The present invention relates to an article storage facility and method of operation therefor comprising an article storage rack having a plurality of storage units for storing articles, the storage units being arranged in a vertical direction and in a lateral direction; and a pair of stacker cranes configured to travel along a travel path provided on a front side of the article storage rack along a rack lateral width direction wherein each of the pair of stacker cranes having a traveling carriage guided by a travel guide rail extending along the travel path, and a vertically movable body including a vertically movable platform configured to be guided for vertical movement by a vertical movement guiding mast provided to stand on the traveling carriage and an article transfer device provided to the vertically movable platform for transferring an article to and from the storage units; a pair of travel position detection means for detecting respective travel positions of the traveling carriages of the pair of stacker cranes; a pair of vertical position detection means for detecting respective vertical positions of the vertically movable bodies of the pair of stacker cranes; and control means for controlling operations of the pair of stacker cranes based on detected information from the pair of travel position detection means and the pair of vertical position detection means.

BACKGROUND ART

The conventional article storage facilities described above perform storage operations in which the articles to be transported are picked up from an article carry-in-and-out portion, such as an article receiving platform, and are unloaded to a storage unit, retrieval operations in which the articles stored in the storage unit are picked up and are unloaded to the article carry-in-and-out portion, and relocating operations in which articles from certain storage units are picked up and are unloaded to other storage units, by performing article transporting operations with stacker cranes.

An article transporting operation of the stacker crane as the expression is used here means an operation of the stacker crane involving a traveling operation of the traveling carriage or the vertical movement operation of the vertically movable body, and includes, not only the actual transporting operation in which the article transfer device supporting the article to be transported is moved on the front side of the rack from the transport origin to the transport destination, but also includes, for example, an empty transporting operation in which the article transfer device supporting no article is moved to the transport origin by a travel operation and a vertical movement operation in order to pick up an article to be transported at the transport origin, as well as a return to origin operation in which the article transfer device supporting no article is moved to a home position in order to have the article transfer device stand by at the home position (starting point) arranged at an end in the direction of the travel path and at the lower end in the vertical direction to prepare for the subsequent storage operation after completing the storage operation.

And when an operation command for an storage operation or retrieval operation for an individual article unit is issued from a management computer with higher commanding status or from a command input means operated by an operator to input commands, the control means is configured to control the operation of the stacker crane to perform an article transporting operation, such as an actual transporting operation or the empty transporting operation, and an article transfer operation, such as a pick up operation for the article at the transport origin (pick up transfer operation) and an unloading operation of the article at the transport destination (unloading transfer operation), in order to have the storage operation or retrieval operation performed based on the operation command.

The travel operation and vertical movement operation in the article transporting operation are operations performed in accordance with a travel speed pattern and a vertical movement speed pattern which are determined based on the positional relationship between the operation starting position and the operation end position of the actual transporting operation and the empty transporting operation based on the operation command, allowing efficient movements, taking as little time as possible from the operation starting position to the operation end position by performing a suitable travel operation and a suitable vertical movement operation.

And, in the article storage facility describe above, a large number of articles that can be stored and retrieved per unit time, i.e., a high article throughput, which indicates the number of operation commands which can be processed, is desired to satisfy the need in the recent mass distribution age to shorten the time it takes to store and retrieve articles. Although various techniques are proposed to improve the article throughput in an article storage facility, it is suggested, for example, to provide a pair of stacker cranes, which can move along a travel path provided on the front side of the article storage rack and extending along the rack lateral width direction.

When providing a pair of stacker cranes to the one travel path, it is necessary to avoid the mutual interference between these stacker cranes. To this end, conventionally, when an operation command is issued, the control is such that a check is first performed to make sure that the other stacker crane, which would be an obstruction in the article transporting operation, is not located in the planned traveling range for the article transporting operation, before the stacker crane is caused to perform the article transporting operation (see, for example, Patent Document 1).

And when the other obstructing stacker crane is located in the planned traveling range for the article transporting operation, the operation of the other stacker crane is controlled to move it out of the planned traveling range if the other stacker crane is not performing an article transporting operation as a stacker crane in duty (that is, it is in a standby state). And if the other stacker crane is performing an article transporting operation as a stacker crane in its duty, the operation of the other stacker crane is controlled to move it out of the planned traveling range after waiting for the article transporting operation by the stacker crane to be completed.

In short, in the conventional article storage facility, when an operation command is issued, a check is made to see if other obstructing stacker cranes for the article transporting operation exist before causing the stacker crane to perform the article transporting operation, and when an obstructive stacker crane exists, an avoidance operation is performed in which the other stacker crane is caused to move to a location where it no longer presents an obstacle.

Incidentally, Patent Document 1 discloses only one common travel guide rail arranged in the travel path and a pair of stacker cranes arranged on this travel guide rail and in the direction of the travel path. And an intermediate section of the travel path is designated to be the shared section in which both stacker cranes can travel, and an exclusive section—where only one stacker crane can move—is designated on either side of the shared section to coincide with the relative positioning of the cranes in the direction of the travel path. And in an avoidance operation, the other stacker crane is moved out along the travel direction. According to FIG. 7 and the description in Paragraphs [0047] and [0048] of Patent Document 1, when an operation command is issued, if the other stacker crane is located in the shared section side area which is within the shared section in the planned traveling range, the travel movement is completed first in the exclusive section side area which belongs to the exclusive section in the planned traveling range. And the stacker crane is caused to wait in the part of the exclusive section side area near the shared section side area until the other obstructing stacker crane is moved out of the shared section side area, so that the article transporting operation can be completed as soon after the operation command is issued as possible based on the operation command.

PRIOR ART DOCUMENTS

Patent Documents

Patent Document 1: Japanese Patent Application Publication No. 2002-175117

SUMMARY OF THE INVENTION

Problems to be Solved by the Invention

In the conventional article storage facility described above, when an operation command is issued, the start of the article transporting operation is delayed or an article transporting operation which had already been started is interrupted until the avoidance operation of other stacker cranes, which presents an obstruction to the article transporting operation, is completed, thus causing the completion of the issued operation command to be delayed. Therefore, there was room for improvement in terms of improving the article throughput.

And when an avoidance operation is ordered for the stacker crane which was standing by and, for example, if an operation command, for an retrieval operation from the storage unit corresponding to the position which the crane just traveled past in the avoidance operation, is issued immediately after the avoidance operation started, then since, if the avoidance operation was not carried out, the article transporting operation for the retrieval operation ordered by an operation command would have been started immediately when the operation command was issued, it would have been possible that the interference with the other stacker crane was also avoided by moving away from a location at which the crane presents an obstacle by performing the article transporting operation based on the operation command concerned.

Thus, in the conventional article storage facility, there is a problem that because the determination is made as to whether a stacker crane that would present an obstacle in an article transporting operation exists at the start of the article transporting operation based on an operation command, and because a decision to perform an avoidance operation for the stacker crane is made immediately if there is an obstructing stacker crane, the avoidance operation of the stacker crane is performed even when interference between the stacker cranes is avoidable without performing the avoidance operation, thus the operation command is processed more efficiently if the avoidance operation was not performed.

Incidentally, in Patent Document 1 described above, if one try to process the operation command for the retrieval operation for the storage unit corresponding to the position which the stacker crane traveled past in an move-out operation by the stacker crane after the move-out operation is completed, both the other stacker crane which caused this stacker crane to move out and the stacker crane which was caused to move out will be performing the article transport operation as the responsible stacker crane. In this case, since the other stacker crane would present an obstacle to the stacker crane that was driven out, the completion of this operation command will be further delayed.

The present invention was made in light of this point, and its object is to provide an article storage facility in which mutual interference between the pair of stacker cranes can be avoided without having to perform the avoidance operation that contributes to inefficiency as a consequence, as much as possible.

Means for Solving the Problems

In order to attain this object, the article storage facility according to the present invention comprises an article storage rack having a plurality of storage units for storing articles, the storage units being arranged in a vertical direction and in a lateral direction; and a pair of stacker cranes configured to travel along a travel path provided on a front side of the article storage rack along a rack lateral width direction, each of the pair of stacker cranes having a traveling carriage guided by a travel guide rail extending along the travel path, and a vertically movable body including a vertically movable platform configured to be guided for vertical movement by a vertical movement guiding mast provided to stand on the traveling carriage and an article transfer device provided to the vertically movable platform for transferring an article to and from the storage units; a pair of travel position detection means for detecting respective travel positions of the traveling carriages of the pair of stacker cranes; a pair of vertical position detection means for detecting respective vertical positions of the vertically movable bodies of the pair of stacker cranes; control means for controlling operations of the pair of stacker cranes based on detected information from the pair of travel position detection means and the pair of vertical position detection means. When an operation command for an article transport is issued to store an article to or to retrieve an article from the storage unit, the control means is configured, based on the operation command, to control an article transporting operation by an assigned stacker crane which is in charge of an article transport specified by the operation command, and to control each travel position of the pair of traveling carriages of the pair of stacker cranes based on the detected information from the pair of travel position detection means, and to determine, at every set period, whether respective travel positions of the pair of traveling carriages are at mutually proximate positions for which the pair of stacker crane are predicted to interfere with each other, while controlling the article transporting operation of the assigned stacker crane, and in that, when respective travel positions of the pair of traveling carriages are at the mutually proximate positions, the control means is configured to perform an interference avoidance process in which operations of the pair of stacker cranes are controlled to position the pair of traveling carriages and the pair of vertically movable bodies at non-interfering positions where the pair of stacker cranes would not interfere with each other, based on the detected information from the pair of travel position detection means and the pair of vertical position detection means.

With this configuration, because the control means determines whether respective travel positions of the pair of traveling carriages are at the mutually proximate positions at every set period while controlling the article transporting operation of the assigned stacker crane, it can be monitored whether they are at the mutually proximate positions while the stacker crane are carrying out the article transporting operations. And the control means performs the interference avoidance process when they are at the mutually proximate positions. Therefore, if the cranes are not at the mutually proximate positions at the beginning of the control of the article transporting operations of the assigned stacker crane, the article transporting operation of the assigned stacker crane is started, and simultaneously, each travel position of the pair of traveling carriage will begin to be monitored. And when the respective travel positions of the pair of traveling carriages reach the mutually proximate positions, the interference avoidance process is performed to position the pair of traveling carriages and the pair of vertically movable bodies at the non-interfering positions in which the pair of stacker cranes would not interfere with each other.

That is, the article transporting operation is continued without executing the operation for avoiding interference, until respective travel positions of the pair of traveling carriages reach the mutually proximate positions, even if the other stacker crane is in the planned traveling range for the article transporting operation. While the article transporting operation is being performed, it is monitored whether respective travel positions of the pair of traveling carriages are at the mutually proximate positions for which the pair of stacker cranes are predicted to interfere with each other. And the pair of stacker cranes can avoid interfering with each other because the interference avoidance process is started when the respective travel positions of the pair of traveling carriages reach the mutually proximate positions.

And because no operation is performed to avoid interference after starting the article transporting operation until the interference avoidance process is started, when the other stacker crane is in the standby state, it will not be taken out of the standby state by making the crane in the standby state carry out the avoidance operation. Accordingly, another operation command may be issued before the interference avoidance process is started, in which case, it can be expected that the other stacker crane is moved out of the planned traveling range by the article transporting operation for this operation command. Therefore, mutual interference between the pair of stacker cranes can be avoided without having to perform an avoidance operation, which leads to inefficiency, as much as possible.

In an embodiment of the present invention, the control means is preferably configured to determine that respective travel positions of the pair of traveling carriages are at the mutually proximate positions when there is an overlap between respective hypothetical braking ranges of respective traveling carriages, which range being a range covered by each traveling carriage from a current position until the time the traveling carriage stops, assuming that each of the pair of traveling carriages is stopped by decelerating at a set deceleration.

With this configuration, it is determined that respective travel positions of the pair of traveling carriages are at the mutually proximate positions if there is an overlap between respective hypothetical braking ranges of respective traveling carriages, which range being a range covered by each traveling carriage from the current position until the time the traveling carriage stops, assuming that each is stopped or caused to stop by decelerating at a set deceleration; therefore, by determining whether they are at the mutually proximate positions at every set period when the traveling carriages are traveling in the article transporting operation, it can be determined after the timing of determination whether the pair of traveling carriages will overlap in the direction of the travel path with certainty regardless of how the travel operation (acceleration operation, fixed-speed operation, deceleration operation) in the article transporting operation changes after the determination was made.

If the hypothetical braking ranges do not overlap, it is possible that the pair of stacker cranes will not interfere with each other depending on the movements in the subsequent article transporting operation. For example, if the traveling carriages which are traveling toward each other are separated by a distance which is greater than the sum of the hypothetical braking ranges for the respective traveling carriages, it is not possible for the pair of stacker cranes to interfere with each other regardless of their vertical movement operations based on the article transfer operations because they will come to stop without the traveling carriages overlapping with each other in the direction of the travel path if they actually decelerate at a set deceleration. And if the traveling carriages are separated by a distance which is greater than the sum of the hypothetical braking ranges for the respective traveling carriages as described above, it is determined that they are not at mutually proximate positions and the interference avoidance operation is not executed; thus, the vertical movement operations based on the article transfer operations are continued.

Thus, by determining that the cranes are at the mutually proximate positions when there is an overlapping portion in the hypothetical braking ranges, it is determined that interference may occur depending on the vertical movement operation based on the article transporting operation if an overlap occurs in the direction of the travel path between the hypothetical braking ranges of the pair of traveling carriages for certain and the interference avoidance process can be performed accordingly. Therefore, an appropriate time to start the interference avoidance process is determined, so that the interference avoidance process can be started at an appropriate time while performing the article transporting operation.

In addition, the hypothetical braking range is used even when the travel speed of traveling carriage is zero, in which case the hypothetical braking range will have zero width, and it can be determined that there is an overlap if its position is in the hypothetical braking range of the other crane.

In an embodiment of the present invention, the control means is preferably configured to perform the interference avoidance process by controlling an operation of only one of the pair of stacker cranes.

With this configuration, because only one of the pair of stacker cranes performs the interference avoidance process and the other does not, and because the other stacker crane can continue with the article transporting operation based on the operation command, without being affected by the interference avoidance process, the article transporting operation for the other stacker crane can be performed smoothly.

In an embodiment of the present invention, the control means is preferably configured to perform the interference avoidance process by controlling an operation of an unassigned stacker crane which is not performing the article transporting operation between the pair of stacker cranes when the control means is causing only one of the pair of stacker cranes to perform the article transporting operation as an assigned stacker crane.

With this configuration, if the travel positions of the pair of traveling carriages reach the mutually proximate positions and the interference avoidance process is performed when only one of the pair of stacker cranes is performing an article transporting operation as an assigned stacker crane, the unassigned stacker crane which is not performing the article transporting operation operates based on the interference avoidance process, and the assigned stacker crane continues with the article transporting operation.

Therefore, interference between the stacker cranes is avoided by operating by the interference avoidance process the unassigned stacker crane, which does not contribute directly to maintaining or improving the article throughput without interrupting the article transporting operation of the assigned stacker crane which directly contributes to maintaining or improving the article throughput.

Deterioration in the article throughput of the facility by the avoidance operation can be prevented by selecting the crane suitable as a stacker crane for executing the avoidance operation in this manner.

In an embodiment of the present invention, the control means is preferably configured to perform the interference avoidance process by controlling an operation of an assigned stacker crane with a longer remaining operation time for the article transporting operation between the pair of stacker cranes when the control means is causing both of the pair of stacker cranes to individually perform the article transporting operation as assigned stacker cranes.

With this configuration, if the travel positions of the pair of traveling carriages reach the mutually proximate positions and the interference avoidance process is performed when both of the pair of stacker cranes are caused to perform an article transporting operation as assigned stacker cranes, the assigned stacker crane with the longer remaining operation time for the article transporting operation is operated by the interference avoidance process, and the assigned stacker crane with the shorter remaining operation time for the article transporting operation continues to perform the article transporting operation.

Therefore, interference between the stacker cranes can be avoided by causing the assigned stacker crane, for which a recovery operation time to make up for the delay from the original article transporting operation is easy to secure because of the comparatively long remaining operation time, to be operated by the interference avoidance process, without interrupting the article transporting operation being performed by the assigned stacker crane for which a recovery operation time to make up for the delay from the original article transporting operation is difficult to secure because of the comparatively short remaining operation time.

Deterioration in the article throughput of the facility by the avoidance operation can be minimized by selecting the crane suitable as a stacker crane for executing the avoidance operation in this manner.

In an embodiment of the present invention, a pair of travel guide rails which are spaced apart in a rack fore and aft direction and which are parallel with each other is provided as the travel guide rail. And a stacker crane with its traveling carriage guided by one of the pair of travel guide rails and with a vertical movement guiding mast provided to the traveling carriage, and another stacker crane with its traveling carriage guided by the other of the pair of travel guide rails and with a vertical movement guiding mast provided to the traveling carriage are provided as the pair of stacker cranes. Each of the pair of vertically movable bodies has a portion which overlaps with the vertically movable body of the other stacker crane in the rack fore and aft direction, and extends in the rack fore and aft direction from the vertical movement guiding mast so as not to reach the vertical movement guiding mast of the other stacker crane so that each of the pair of stacker cranes can pass each other. And the control means is preferably configured to execute an interference avoidance vertical movement process, as the interference avoidance process, in which vertical movements of the pair of vertically movable bodies are controlled to raise or lower the pair of vertically movable bodies to vertical positions for passing each other which are spaced apart in a vertical movement direction by a distance greater than or equal to a required separating distance which is defined as a separating distance which allows the pair of stacker cranes to pass each other without interfering with each other.

With such a feature, each traveling carriage of the pair of stacker cranes travels on a respective one of the pair of travel guide rails which are spaced apart in the rack fore and aft direction and which are parallel with each other. And because each vertically movable body extends in the rack fore and aft direction from the vertical movement guiding mast so as not to reach the vertical movement guiding mast of the other stacker crane so that the pair of stacker cranes can pass each other, each stacker crane can travel over the entire rack lateral width in the rack lateral width direction on the front side of the article storage rack, regardless of the travel position of the other stacker crane.

As an example of a facility with a pair of stacker cranes provided in the travel path, there is one in which one travel guide rail is laid along the travel path, and in which a pair of stacker cranes movable on this travel guide rail are arranged in the direction of the travel path. However, with this configuration, there is a restriction that, in order to transfer an article to or from the storage unit of the article storage rack located beyond the other crane in the direction of the other crane, the other crane needs to be positioned farther beyond the storage unit in the direction of the other crane, which is inconvenient.

Moreover, since a large amount of movement and time is required for the other stacker crane to perform the move-out operation as the result of the article transporting operation of one stacker crane, the article throughput does not improve appreciatively despite the fact that a pair of stacker cranes are provided.

In this regard, with the above-described configuration, the cranes can travel over the entire rack lateral width in the rack lateral width direction regardless of the position of the other stacker crane with respect to the travel movement. Therefore, a facility that is convenient to use is provided when providing a pair of stacker crane to improve the article transporting capacity.

And because each vertically movable body of the pair of stacker cranes has a portion that overlaps with the vertically movable body of the other stacker crane in the rack fore and aft direction, the travel paths required by each of the stacker cranes overlap in part in the rack fore and aft direction, therefore, the travel paths for the two stacker cranes can be made narrower than a width which is obtained by simply doubling the width for one crane. Therefore, installation space for providing a pair of stacker cranes to be arranged in the rack fore and aft direction can be made compact.

And because the control means executes the interference avoidance vertical movement process as an interference avoidance process to control the vertical movement operations of the pair of vertically movable bodies when the travel positions of the traveling carriages of the pair of stacker crane are at the mutually proximate positions, to raise and lower the pair of vertically movable bodies to the vertical positions for passing each other which are spaced apart in the vertical movement direction by a distance greater than or equal to the required separating distance which is defined as a separating distance which allows the pair of stacker cranes to pass each other without interfering with each other, the pair of stacker crane can perform the article transporting operations by traveling in the rack lateral width direction over the entire rack lateral width without interfering with each other.

Thus, the above-described configuration provides for an article storage facility which is convenient to use and is compact, and for an efficiently improved throughput as a result of providing a pair of stacker cranes.

In an embodiment of the present invention, the control means is preferably configured to derive, in the interference avoidance vertical movement process, a maximum vertical movement range, for the vertically movable body of the assigned stacker crane, which is a vertical movement range in which the vertically movable body can be raised or lowered by the article transporting operation in a remaining time from the time respective travel positions of the pair of traveling carriages reach the mutually proximate positions until assumed interference travel positions at which the pair of vertically movable bodies interfere with each other are reached when the traveling carriages are caused to travel and decelerate at a set deceleration, is configured to determine that an interference non-occurring state exists in which the pair of stacker cranes would not interfere with each other if the respective maximum vertical movement ranges for the pair of vertically movable bodies do not overlap because the ranges are separated from each other by a distance greater than the required separating distance when both of the pair of stacker cranes are caused to perform an article transporting operation as assigned stacker cranes, and, is configured to determine that an interference non-occurring state exists if an interference range which extends in both vertical directions along the vertical movement direction about a vertical position of the vertically movable body of the other stacker crane by the required separating distance does not overlap with the maximum vertical movement range for the vertically movable body of the assigned stacker crane when only one of the pair of stacker cranes is caused to perform an article transporting operation as an assigned stacker crane. And the control means is preferably configured to control vertical movement operations of the pair of vertically movable bodies, on one hand, to perform the article transporting operation in which vertical movement operations of the pair of vertically movable bodies are not controlled using the interference avoidance vertical movement process if it is determined that the interference non-occurring state exists in the interference avoidance vertical movement process, and, on the other hand, to perform the article transporting operation by controlling the pair of vertically movable bodies using the interference avoidance vertical movement process if it is determined that the interference non-occurring state does not exist in the interference avoidance vertical movement process.

With this configuration, a maximum vertical movement range, for the respective vertically movable body is derived, which is a vertical movement range in which the vertically movable body can be raised or lowered by the article transporting operation in a remaining time from the time respective travel positions of the pair of traveling carriages reach the mutually proximate positions until the assumed interference travel positions are reached when the traveling carriages are caused to travel and decelerate at a set deceleration. And it is determined that an interference non-occurring state exists in which the pair of stacker cranes would not interfere with each other if the respective maximum vertical movement ranges for the pair of vertically movable bodies do not overlap because the ranges are separated from each other by a distance greater than the required separating distance when both of the pair of stacker cranes are caused to perform an article transporting operation as assigned stacker cranes.

That is, even if the traveling carriages approach each other as the article transporting operation proceeds, if the maximum vertical movement ranges for the vertically movable bodies do not overlap with each other because the ranges are separated from each other by a distance greater than the required separating distance, then the upper limit of the maximum vertical movement range for one vertically movable body and the lower limit of the maximum vertical movement range for the other vertically movable body are separated from each other by a distance greater than the required separating distance. Therefore, it is determined that the interference non-occurring state exists in such situation because the pair of stacker crane will not interfere with each other even if the pair of vertically movable bodies approach each other to the closest positions to each other in the vertical movement direction.

Similarly, when only one of the pair of stacker cranes is caused to perform an article transporting operation as an assigned stacker crane, it is determined that an interference non-occurring state exists if an interference range which extends in both vertical directions along the vertical movement direction about a vertical position of the vertically movable body of the other stacker crane (unassigned stacker crane) by the required separating distance does not overlap with the maximum vertical movement range for the vertically movable body of the assigned stacker crane.

That is, even if the traveling carriages approach each other as the article transporting operation proceeds, if an interference range which extends in both vertical directions along the vertical movement direction about a vertical position of the vertically movable body of the unassigned stacker crane by the required separating distance does not overlap with the maximum vertical movement range for the vertically movable body of the assigned stacker crane, the vertical position of the vertically movable body of the unassigned stacker crane is spaced from the upper limit position or the lower limit position of the maximum vertical movement range by a distance greater than the required separating distance. Thus, it is determined that the interference non-occurring state exists in such situation because the pair of stacker crane will not interfere with each other even if the pair of vertically movable bodies approach each other to the closest positions to each other in the vertical movement direction.

And if it is determined in the interference avoidance vertical movement process that the interference non-occurring state exists, the control means causes the article transport operations to be performed by controlling the vertical movement operations of the pair of vertically movable body without using the interference avoidance vertical movement process, in which case, the vertical movement operations of the pair of vertically movable body are ones that are based on the article transporting operation. If it is determined in the interference avoidance vertical movement process that the interference non-occurring state does not exist, the article transporting operations are performed by controlling the pair of vertically movable bodies using the interference avoidance vertical movement process. Thus, the vertical movement operations of the pair of vertically movable bodies are controlled using the interference avoidance vertical movement process, and vertical movement operations different from the article transporting operation will be carried out to position the pair of vertically movable bodies at the vertical positions for passing each other.

Thus, when interference between the pair of stacker cranes cannot occur, the vertical movement operations of the pair of vertically movable bodies are not controlled by the interference avoidance vertical movement process so that the article transporting operations proceed. And when the pair of stacker cranes can interfere with each other, the interference avoidance vertical movement process is performed to carry out vertical movement operations that are different from the article transporting operation.

Therefore, the interference avoidance vertical movement process can be prevented from being executed more often than required so as to minimize the occurrence of interruptions to the article transport operations. Thus, deterioration in the article throughput of the facility can be minimized.

In addition to the conventional technology described above, it is proposed in JP Publication Of Application No. 2007-015780 to provide a facility where one travel guide rail is provided to extend along the travel path, and two stacker cranes which can move on this travel guide rail are arranged in the direction of the travel path, as a facility where a pair of stacker cranes is placed on one travel path.

As another example of a facility where a pair of stacker cranes is placed on one travel path, it is proposed in JP Publication Of Application No. H07-125810 to provide a facility where two travel guide rails are provided to extend along the travel path and to be spaced apart from each other in the rack fore and aft direction and one stacker crane is provided to each of the travel guide rail so that the stacker cranes can move along the two travel paths what are adjacent each other in the rack fore and aft direction.

With the facility proposed in JP Publication Of Application No. 2007-015780, in order to transfer an article to or from a storage unit located beyond the other stacker crane in the direction in which the two stacker cranes are arranged, it is necessary to move the other stacker crane out of the way by moving it beyond the storage unit in the direction in which the two stacker cranes are arranged, which makes the facility cumbersome to use. In addition, the greater the range in the rack lateral width direction of the article transporting operation of each stacker crane is, more often the stacker crane will have to move out of the way. And because a large amount of work and operation time due to unnecessary operation of the other stacker crane arises because of the article transport operation of one stacker crane, article throughput does not improve greatly despite the fact that a pair of stacker cranes is provided.

With the facility proposed in JP Publication Of Application No. H07-125810 because each stacker crane can move over the entire range in the rack lateral width direction regardless of the position of the other stacker crane, and without moving the other stacker crane out of the way as far as traveling movements are concerned, the article throughput can be expected to improve greatly. However, since the travel paths of the stacker cranes are located close to each other, the lateral width of the travel path of the pair of stacker cranes ends up being the sum of the widths of the travel path width of each stacker crane. Therefore, there is a disadvantage that the travel path space becomes large and the installation space of the facility becomes large.

Further, since the distance to each storage unit in the article storage rack is greater for the stacker crane which travels on the travel guide rail which is farther from the rack in the rack fore and aft direction, the article transfer device for transferring articles between the storage units and the stacker crane must be a one that is capable of transferring articles to or from storage units that are located farther away. Thus, for example, as shown in FIG. 4 of the patent document 2, when the article transfer device is a type that has an article support that utilizes a slide fork mechanism which can project and retract in the rack fore and aft direction, it must have a long slide stroke, which adds to the complexity of the structure of the article transfer device.

Therefore, where a pair of stacker crane is provided, the conventional article storage facilities have the following problems: the installation space of the facility becomes large because of the large width of the travel path; it is cumbersome to use; article throughput does not improve effectively even with two stacker cranes; and the structure of the article transfer device becomes more complex. No article storage facility has been suggested that solves many of these problems on a fundamental level.

In order to improve such points, in an embodiment of the present invention, it is preferable that a pair of travel guide rails which are spaced apart in a rack fore and aft direction and which are parallel with each other is provided as the travel guide rail, and a stacker crane with its traveling carriage guided by one of the pair of travel guide rails and with a vertical movement guiding mast provided to the traveling carriage, and another stacker crane with its traveling carriage guided by the other of the pair of travel guide rails and with a vertical movement guiding mast provided to the traveling carriage are provided as the pair of stacker cranes, each of the pair of vertically movable bodies has a portion which overlaps with the vertically movable body of the other stacker crane in the rack fore and aft direction, and extends in the rack fore and aft direction from the vertical movement guiding mast so as not to reach the vertical movement guiding mast of the other stacker crane so that each of the pair of stacker cranes can pass each other, and that the control means is configured to control each travel position of the pair of traveling carriages of the pair of stacker cranes and each vertical position of the pair of vertically movable bodies of the pair of stacker cranes based on the detected information from the pair of travel position detection means and the pair of vertical position detection means when controlling the article transporting operations of the pair of stacker cranes, and is configured to perform, as the interference avoidance process, a mutual avoidance vertical movement process in which both of the pair of vertically movable bodies are raised or lowered by a vertical movement operation for avoiding interference which is different from a vertical movement operation in the article transporting operation to raise or lower the pair of vertically movable bodies to vertical positions for passing each other which are spaced apart in a vertical movement direction by a distance greater than or equal to a required separating distance which is defined as a separating distance which allows the pair of stacker cranes to pass each other without interfering with each other.

With this configuration, since each of the vertically movable bodies of the pair of stacker cranes has a portion that overlaps with the vertically movable body of the other stacker crane in rack fore and aft direction, the travel paths of the stacker cranes overlap in part in the rack fore and aft direction; thus, the travel path for the two stacker cranes can be made narrower than that which is simply double the width of the travel path of one stocker crane. Therefore, the travel path width of the pair of stacker cranes can be made smaller and, thus, the facility can be more compact when providing a pair of stacker cranes arranged in the rack fore and aft direction, In addition, since each of the vertically movable bodies of the pair of stacker cranes has a portion that overlaps with the vertically movable body of the other stacker crane in rack fore and aft direction, the vertically movable body of the stacker crane which is farther away from the article storage rack in the rack fore and aft direction would be located in the position closer to the rack side in the rack fore and aft direction when compared with a case where there is no portion which overlaps with the vertically movable body of the other stacker crane in the rack fore and aft direction. Therefore, the article transfer device which the vertically movable body has can transfer articles between a storage unit and the stacker crane from positions which are comparatively close to the storage rack in the rack fore and aft direction. Therefore, since it is not necessary to provide the article transfer device with a slide fork mechanism having a long stroke etc., it helps reducing the complexity of the structure of the article transfer device.

Further, since each traveling carriage of the pair of stacker cranes travels on the respective one of the pair of travel guide rails which are spaced apart from each other in the rack fore and aft direction and which are installed to extend in parallel, and since each vertically movable body extends in the rack fore and aft direction from the vertical movement guiding mast such as not to reach the vertical movement guiding mast of the other stacker crane and so that the pair of stacker crane can pass each other when traveling, each stacker crane can travel over the entire rack lateral width in the rack lateral width direction on the rack front side of the article storage rack, regardless of the travel position of the other stacker crane.

Therefore, as far as the travel movements are concerned, each stacker crane can freely travel over the entire range in the rack lateral width direction regardless of the position of the other stacker crane, and without having to move the other stacker crane out of the way as long as the two vertically movable bodies are located in the vertical positions at which they do not interfere. Therefore, since the article transporting operations of the two stacker cranes can be carried out separately, article throughput is improved greatly.

And when an operation command for an article transport to store an article to or to retrieve an article from the storage unit is issued, the control means controls the article transporting operation for an assigned stacker crane which is in charge of article transporting specified by the operation command, based on the operation command. In that case, each travel position of the pair of traveling carriages of the pair of stacker cranes and the respective vertical position of each of the pair of vertically movable bodies of the pair of stacker cranes are controlled based on the detected information from the pair of travel position detection means and the pair of vertical position detection means.

Since the control means performs a mutual avoidance vertical movement process in which the pair of vertically movable bodies are raised or lowered by a vertical movement operation for avoiding interference which is different from the vertical movement operation in the article transporting operation in order to raise or lower the pair of vertically movable bodies to vertical positions for passing each other which are spaced apart in the vertical movement direction by a distance greater than or equal to a required separating distance which is defined as a separating distance which allows the pair of stacker cranes to pass each other without interfering with each other, both of the pair of vertically movable bodies perform the vertical movement operation in accordance with the mutual avoidance vertical movement process; therefore, the pair of stacker cranes can pass each other and move without interfering with each other.

Thus, the article transporting operation can be performed by moving the cranes over the entire rack lateral width in the rack lateral width direction without the pair of stacker cranes interfering each other. And since both of the vertically movable bodies are moved when raising or lowering to the vertical positions for passing each other, the amount of vertical movement required to raise and lower the vertically movable bodies to the vertical positions for passing each other is shared by both of the vertically movable bodies of the pair of stacker crane; therefore, the pair of vertically movable bodies can be quickly raised or lowered to the vertical positions for passing each other while preventing the vertical movement of each vertically movable body from being diverted to a great extent from the article transporting operation, thus reducing the possibility of lowering the efficiency of the article transporting operation.

Accordingly, the article storage facility is provided which takes up less space by making the travel path width of the pair of stacker crane as narrow as possible, and in which the configuration is simplified as much as possible while improving article throughput effectively.

In an embodiment of the present invention, the control means is preferably configured to derive, in the mutual avoidance vertical movement process, a maximum vertical movement range, for the vertically movable body of the assigned stacker crane, which is a vertical movement range in which the vertically movable body can be raised or lowered by the article transporting operation in a remaining time from the time respective travel positions of the pair of traveling carriages reach the mutually proximate positions until assumed interference travel positions at which the pair of vertically movable bodies interfere each other are reached when the traveling carriages are caused to travel and decelerate at a set deceleration, and preferably is configured to determine that an interference non-occurring state exists in which the pair of stacker cranes would not interfere with each other if the respective maximum vertical movement ranges for the pair of vertically movable bodies do not overlap because the ranges are separated from each other by a distance greater than the required separating distance when both of the pair of stacker cranes are caused to perform an article transporting operation as assigned stacker cranes, and is preferably configured to determine that an interference non-occurring state exists if an interference range which extends in both vertical directions along a vertical movement direction about a vertical position of the vertically movable body of the other stacker crane by the required separating distance does not overlap with the maximum vertical movement range for the vertically movable body of the assigned stacker crane when only one of the pair of stacker cranes is caused to perform an article transporting operation as an assigned stacker crane, and the control means is preferably configured to control vertical movement operations of both of the pair of vertically movable bodies, on one hand, to perform the article transporting operation in which vertical movement operations of the pair of vertically movable bodies are not controlled using the mutual avoidance vertical movement process if it is determined that the interference non-occurring state exists in the mutual avoidance vertical movement process, and, on the other hand, to perform the article transporting operation by controlling the pair of vertically movable bodies using the mutual avoidance vertical movement process if it is determined that the interference non-occurring state does not exist in the mutual avoidance vertical movement process.

With this configuration, the maximum vertical movement range, which is the vertical movement range in which the vertically movable body can be raised or lowered by article transporting operation in the remaining time until the assumed interference travel positions are reached, is derived for each vertically movable body when the traveling carriages in a travel operation are decelerated at a set deceleration after each of the travel positions of the pair of traveling carriages reaches the mutually proximate position. And it is determined that an interference non-occurring state exists in which the pair of stacker cranes would not interfere with each other if the respective maximum vertical movement ranges for the pair of vertically movable bodies do not overlap because the ranges are separated from each other by a distance greater than the required separating distance when both of the pair of stacker cranes are caused to perform an article transporting operation as assigned stacker cranes.

That is, even if the article transporting operation advances and traveling carriages approach each other, the upper limit of the maximum vertical movement range for one vertically movable body is separated from the lower limit of the maximum vertical movement range for the other vertically movable body by a distance greater than the required separating distance if the maximum vertical movement ranges for the vertically movable bodies do not overlap because the ranges are separated from each other by a distance greater than the required separating distance. Thus, since interference between the pair of stacker cranes will not occur even if they approach each other to the maximum extent in the vertical movement direction, it is determined that the interference non-occurring state exits in such a case.

Similarly, when only of the pair of stacker cranes is caused to perform an article transporting operation as assigned stacker cranes, it is determined that an interference non-occurring state exists if an interference range which extends along the vertical movement direction about a vertical position of the vertically movable body of the other stacker crane (unassigned stacker crane) by the required separating distance does not overlap with the maximum vertical movement range for the vertically movable body of the assigned stacker crane.

That is, even if the article transporting operation advances and traveling carriages approach each other, the vertical position of the vertically movable body of the unassigned stacker crane is separated from the upper limit position or the lower limit position of the maximum vertical movement range by a distance greater than the required separating distance if an interference range which extends along the vertical movement direction about a vertical position of the vertically movable body of the unassigned stacker crane by the required separating distance does not overlap with the maximum vertical movement range for the vertically movable body of the assigned stacker crane. Thus, since interference between the pair of stacker cranes will not occur even if they approach each other to the maximum extent in the vertical movement direction, it is determined that the interference non-occurring state exits in such a case.

And if it is determined that the interference non-occurring state exist in the mutual avoidance vertical movement process, the control means causes the article transport operations to be performed by controlling the vertical movement operations of the pair of vertically movable body without using the mutual avoidance vertical movement process; thus, the vertical movement operations of the pair of vertically movable bodies are performed based on the article transporting operation. And if it is determined in the mutual avoidance vertical movement process that the interference non-occurring state does not exist, the control means causes the article transport operations to be performed by controlling the pair of vertically movable body using the mutual avoidance vertical movement process; thus, the vertical movement operations of both of the pair of vertically movable bodies are controlled by the mutual avoidance vertical movement process, and a vertical movement operation that is different from the article transporting operation will be carried out so as to place the pair of vertically movable bodies at the vertical positions for passing each other.

Thus, when interference between the two stacker cranes cannot occur, the vertical movement operations of the pair of vertically movable bodies are not controlled by the mutual avoidance vertical movement process; thus, the article transporting operation may proceed. And, when interference of the pair of stacker cranes can occur, the mutual avoidance vertical movement process is performed, so that both of the vertical movement bodies are caused to perform movement operations that are different from the article transporting operation.

Therefore, the mutual avoidance vertical movement process is prevented from being executed more often than needed so that the article transporting operation is prevented from being changed; thus, the article transporting capacity of the facility is prevented from declining as much as possible.

In an embodiment according to the present invention, the control means is preferably configured to control the article transporting operation for the assigned stacker crane by issuing, at every set control period, a target travel position for the traveling carriage and a target vertical position for the vertically movable body which are updated at every set control period based on a travel pattern for the article transporting operation and a vertical movement pattern for the article transporting operation which are generated in association with the operation command, and is preferably configured, as the mutual avoidance vertical movement process, to control vertical movement operations of both of the pair of vertically movable bodies to raise and lower the pair of vertically movable bodies to the vertical positions for passing each other by issuing for the assigned stacker crane, at every set control period, a target vertical position for avoiding interference which is updated based on vertical positions, vertical movement speeds, and the required separating distance for the vertically movable bodies of the pair of stacker cranes, in place of the target vertical position for the vertically movable body specified based on the vertical movement pattern for the article transporting operation.

With this configuration, the control means controls the article transporting operation of the assigned stacker crane by issuing the target travel position and the target vertical position at every set control period. The target travel position and the target vertical position are updated or generated at every set control period based respectively on the travel pattern for the article transporting operation and on the vertical movement pattern for the article transporting operation which are generated based on the operation command. That is, if the travel position or travel speed of the traveling carriage deviates from the travel pattern for the article transporting operation at a control timing, the target travel position is updated so that the deviation can be corrected. Similarly, if the vertical position or the vertical movement speed of the vertically movable body deviates from the vertical movement pattern for the article transporting operation at a control timing, the target vertical position is updated so that the deviation can be corrected. Therefore, in an article transporting operation, the travel operation and the vertical movement operation are performed to match the travel pattern for the article transporting operation and the vertical movement pattern for the article transporting operation respectively as well as possible.

In the mutual avoidance vertical movement process, the control means controls the vertical movement operations of both of the pair of vertically movable bodies by issuing the target vertical position for interference avoidance at every set control period in order to raise or lower the pair of vertically movable bodies to the vertical positions for passing each other. The target vertical positions for avoiding interference are updated based on the vertical positions, the vertical movement speeds, and the required separating distance for the vertically movable bodies of the pair of stacker cranes. That is, the target vertical positions—which are appropriate positions to cause the pair of vertically movable bodies to be raised or lowered to the vertical positions for passing each other which are separated by a distance greater than the required separating distance in the vertical movement direction—are updated as target vertical positions for avoiding interference depending on the vertical positions and the vertical movement speeds of both of the vertically movable bodies at a control timing. Therefore, in the vertical movement operation in the mutual avoidance vertical movement process, suitable target vertical positions, which take the vertical positions and vertical movement speeds of the vertically movable bodies into consideration at every control timing, are issued to perform the vertical movement operations to cause the bodies to move toward the vertical positions for passing each other; thus, the amount of unnecessary vertical movements to raise or lower the vertically movable bodies to the vertical positions for passing each other can be reduced as much as possible.

Accordingly, in an article transporting operation, the travel operation and the vertical movement operation are performed to match the travel pattern for the article transporting operation and the vertical movement pattern for the article transporting operation respectively as well as possible. And although the vertical movement operation is different from the article transporting operation in the vertical movement operation in the mutual avoidance vertical movement process which is an avoidance operation to enable the pair of stacker cranes to pass each other and travel without interfering, the vertically movable bodies can be raised or lowered to the vertical positions for passing each other with the smallest possible amount of vertical movement operations. Therefore, there is no need to rush when the vertically movable bodies are caused to be raised or lowered to the vertical positions for passing each other by the mutual avoidance vertical movement process, so that the pair of vertically movable bodies can be reliably raised or lowered to the vertical positions for passing each other.

In an embodiment of the present invention, the control means is preferably installed on the ground side and is configured to include a first crane control means for controlling an operation of one stacker crane between the pair of stacker cranes, and a second crane control means for controlling an operation of the other stacker crane.

With this configuration, since operation of each of the pair of stacker cranes is controlled by the first crane control means and the second crane control means respectively which are provided to the control means installed on the ground side, the control configuration to be provided to each stacker crane may be a simple one, for example, which is a simple servo control in which the traveling carriage and the vertically movable body of the stacker crane are moved to the target position based on target position information. Therefore, the control configuration for each of the pair of stacker cranes may be simplified.

The method for operation for the article transport facility which has the steps that generally correspond to these configurations has the advantages corresponding to those of the various configurations described above.

DETAILED DESCRIPTION OF THE INVENTION

The preferred embodiments of the present invention are described next. Although a plurality of embodiments are described, a combination of a feature in one embodiment and a feature in a different embodiment is also considered to be within the scope of the present invention.

Embodiment 1

Figure 1:
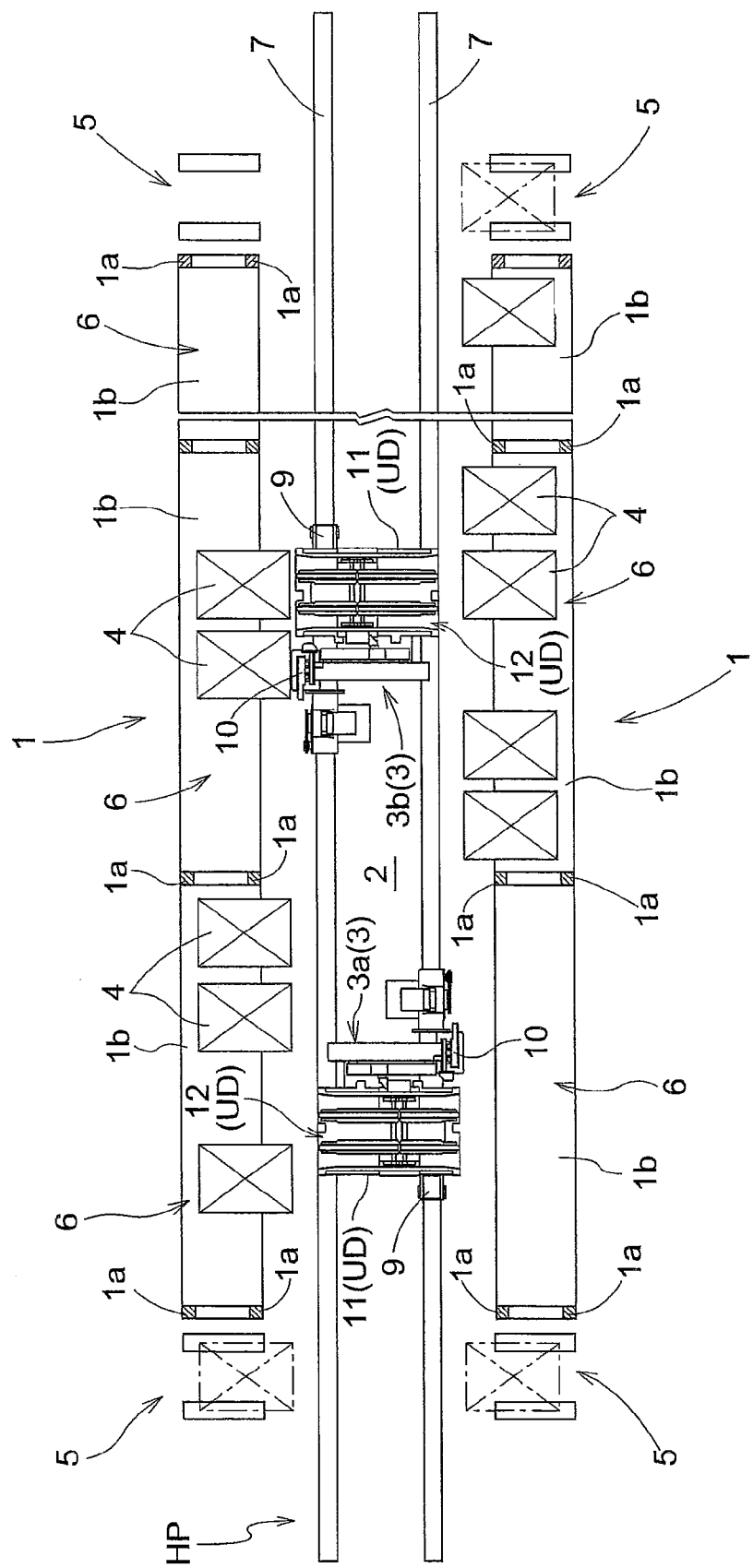
FIG. 1 is a plan view of the article storage facility.
Figure 2:
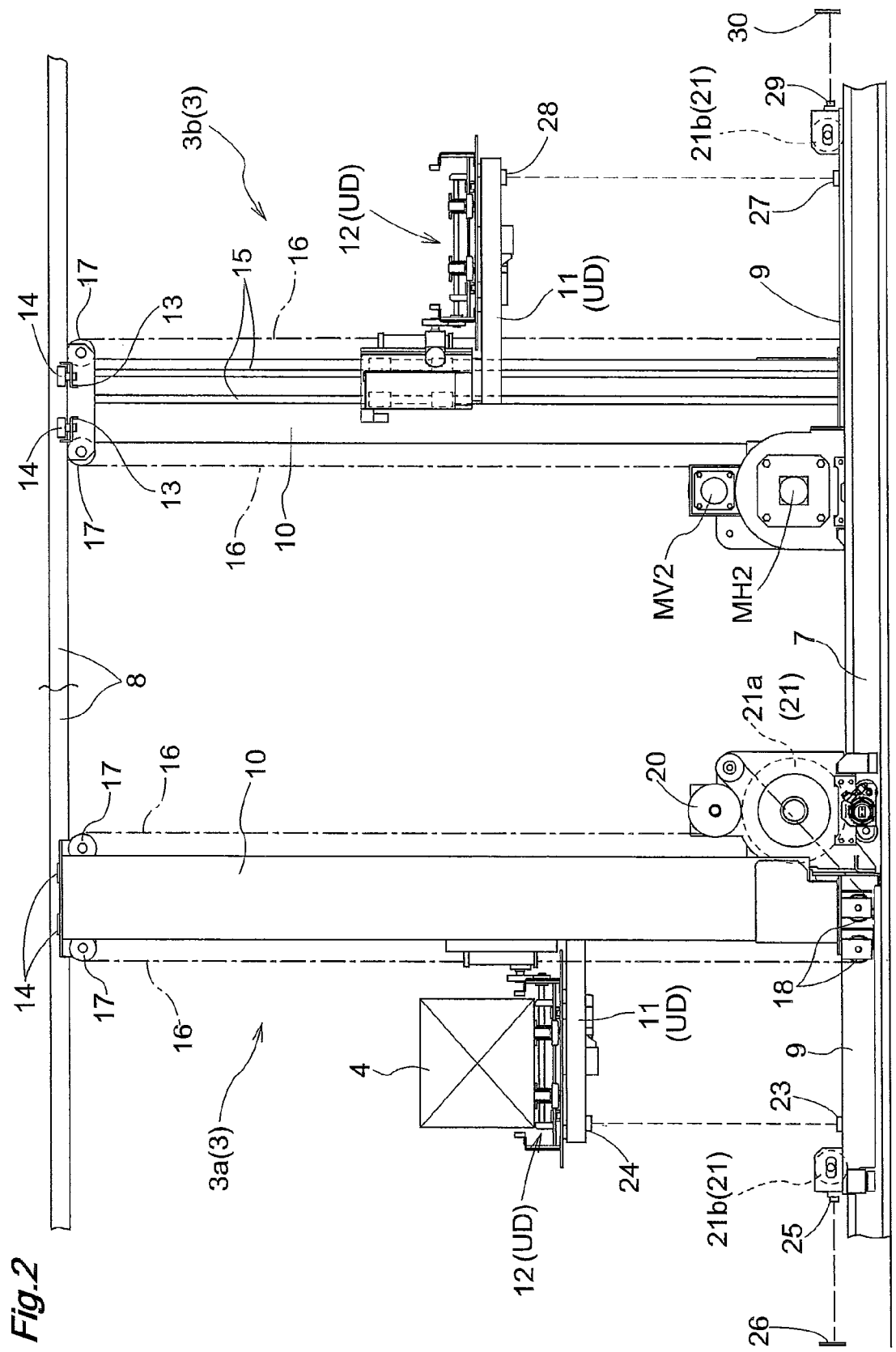
FIG. 2 is a sectional view in the lateral width direction of the travel path of the article storage rack.
Figure 3:
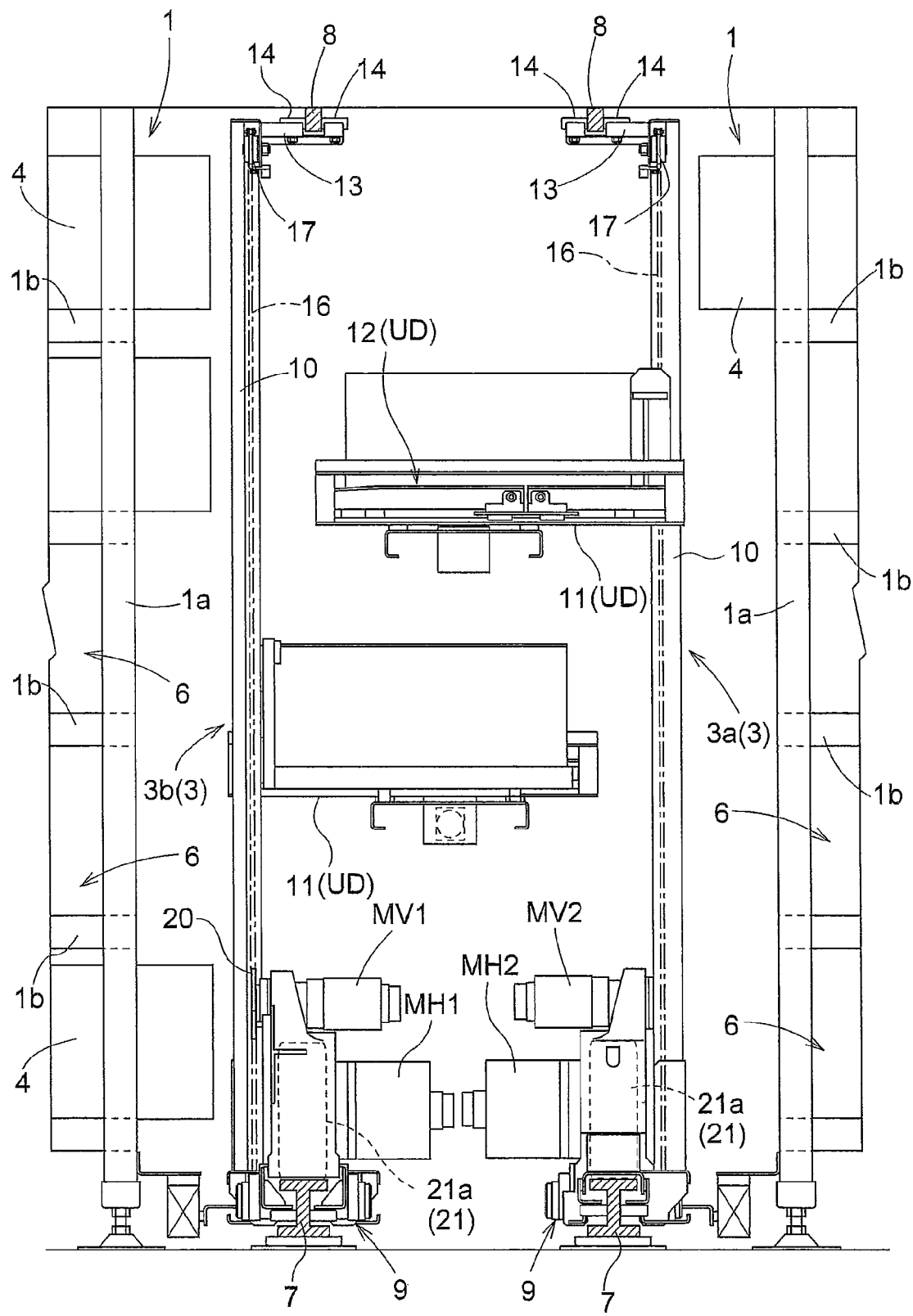
FIG. 3 is a sectional view in the longitudinal direction of the travel path of the article storage rack.

The preferred embodiment for an article storage facility in accordance with the present invention is described with reference to the attached drawings. As shown in FIGS. 1-3, this article storage facility includes two article storage racks 1 which are installed to be spaced apart from each other such that the side of one of the racks where articles are brought into and taken out of faces the side of the other of the racks where articles are brought into and taken out of, and stacker cranes 3 which move in a travel passage 2 (which corresponds to the travel path) formed between the two article storage racks 1. Provided on either side of the article storage rack 1 in the rack lateral width direction (longitudinal direction of the rack) is a carry in and out portion 5 for receiving and supporting the article 4 carried in from the outside and for receiving and supporting articles 4 which are being retrieved from the article storage rack 1 and taken out to the outside.

Each article storage rack 1 includes a plurality of front and back pairs of vertical support columns 1a with each pair separated from one another in the rack lateral width direction and a plurality of vertically-spaced shelf boards 1b connecting neighboring columns 1a in the rack lateral width direction. Each shelf board 1b is configured to receive and support an article 4 such that a part of the article 4 projects toward the front in the rack fore and aft direction. The shelf boards 1b are configured such that a plurality of articles 4 are received and supported with the plurality of articles 4 being lined up in the rack lateral width direction. Thus, the storage units 6 of the article storage rack 1 are configured to store articles 4 with the articles 4 placed on and supported by the shelf boards 1b. The storage units 6 are provided on both sides of the travel passage 2 in the rack fore and aft direction (direction which intersects perpendicularly with the rack lateral width direction) and such that a plurality of them line up in the vertical direction and in the right and left direction or the lateral direction.

Provided as the stacker cranes 3 are a first stacker crane 3a (hereinafter referred to as No. 1 crane 3a) which moves on one side in the rack fore and aft direction with respect to the center of the travel passage 2, and a second stacker crane 3b (hereinafter referred to as No. 2 crane 3b) which moves on the other side in the rack fore and aft direction. Two lower rails 7 (which correspond to the travel guide rails) are laid in parallel along the rack lateral width direction on the floor surface of the travel passage 2, and two upper rails 8 are arranged in parallel along the rack lateral width direction above the travel passage 2. Of the two lower rails 7 and upper rails 8, the ones on one side in the rack fore and aft direction are for allowing the No. 1 crane 3a to travel along the travel passage 2, and the ones on the other side in the rack fore and aft direction are for allowing the No. 2 crane 3b to travel along the travel passage 2. Each of the No. 1 crane 3a and No. 2 crane 3b is configured to be able to travel in the travel passage 2 in both directions over the total length of the article storage rack 1 in the rack lateral width direction and the locations of the carry in and out portions 5.

The No. 1 crane 3a and No. 2 crane 3b are described next. No. 1 crane 3a and No. 2 crane 3b are identical in structure and differ only in that they are oriented in the opposite direction in the travel passage 2. Accordingly, they will be referred to as stacker cranes 3 when describing the same structures without distinguishing between the No. 1 crane 3a and No. 2 crane 3b.

The stacker crane 3 includes a traveling carriage 9 which can travel along the lower rail 7, and a vertically movable platform 11 which can be raised and lowered along a vertical movement guiding mast 10 arranged vertically on the traveling carriage 9. The vertically movable platform 11 is provided with an article transfer device 12 which can transfer articles 4 to and from the storage units 6 and the carry in and out portion 5. The vertically movable platform 11 and the article transfer device 12 constitute the vertically movable body UD.

The traveling carriages 9 are formed to have a flat shape which is long in the rack lateral width direction, and are configured to travel in the travel passage 2 such that the traveling carriage 9 of the No. 1 crane 3a and the traveling carriage 9 of the No. 2 crane 3b can pass each other.

The vertical movement guiding mast 10 of No. 1 crane 3a is provided to the traveling carriage 9 at a location displaced toward one side (direction toward the closer one of the racks) in the rack fore and aft direction, and the vertical movement guiding mast 10 of No. 2 crane 3b is provided to the traveling carriage 9 at a location displaced toward the other side (direction toward the closer one of the racks) in the rack fore and aft direction.

The vertically movable platform 11 of No. 1 crane 3a extends from the vertical movement guiding mast 10 of the No. 1 crane 3a in the rack fore and aft direction and is cantilevered to the vertical movement guiding mast 10 such that it does not contact the vertical movement guiding mast 10 of No. 2 crane 3b, and the vertically movable platform 11 of No. 2 crane 3b also extends from the vertical movement guiding mast 10 of the No. 2 crane 3b in the rack fore and aft direction and is cantilevered to the vertical movement guiding mast 10 such that it does not contact the vertical movement guiding mast 10 of No. 1 crane 3a.

Thus, No. 1 crane 3a and No. 2 crane 3b are configured to travel in the travel passage 2 in both directions such that they can pass each other.

The vertical movement guiding mast 10 is formed to have a flat shape which is long in the rack lateral width direction, and is arranged vertically at one end side of the traveling carriage 9 in the rack lateral width direction. The vertical movement guiding mast 10 is provided to the traveling carriage 9 to stand vertically at the position offset from the lower rail 7 toward the article storage rack 1 as viewed in the rack lateral width direction. The vertical movement guiding mast 10 is configured such that its upper end is higher than the lower end portion of the upper rail 8. Two upper guide rollers 14 are provided at the upper end portion of the vertical movement guiding mast 10 such as to hold the upper rail 7 between the guide rollers 14 and are supported by the support 13 extending in the rack fore and aft direction. Movement of the stacker crane 3 in the rack fore and aft direction is restricted by the contact between these two upper guide rollers 14 and the upper rails 7.

The vertically movable platform 11 fittingly engages with two rails 15 for vertical movement provided in the vertical movement guiding mast 10 to be able to move up and down in the vertical direction by means of the single vertical movement guiding mast 10. One end of a chain 16 for raising and lowering the vertically movable platform 11 is connected to the vertically movable platform 11. The raising and lowering chain 16 is wound around an upper sprocket 17 provided in the upper portion of the vertical movement guiding mast 10, wound around a lower sprocket 18 provided in the traveling carriage 9, and its other end is connected to the vertically movable platform 11. A drive sprocket 20 rotated by a vertical movement electric motor MV is provided to engage the raising and lowering chain 16. The vertically movable platform 11 is configured to be raised and lowered by the movement of the raising and lowering chain 16 in its longitudinal direction by the forward and reverse rotations of the vertical movement electric motor MV. It is also possible to use other known material, such as a wire in place of the raising and lowering chain 16.

The travel wheels 21 which can rotate on the lower rail 7 are provided to the traveling carriage 9. One of the pair of back and front travel wheels 21 is configured to be a drive wheel 21a rotated by the travel electric motor MH, and the other wheel is configured to be a free-rotating wheel 21b which is freely rotatable.

A first laser vertical range finder 23 is provided to the traveling carriage 9 of No. 1 crane 3a (second vertical laser range finder 27 for No. 2 crane 3b) for detecting the vertical position of the vertically movable body UD in the vertical movement path. The first laser vertical range finder 23 is configured to measure the distance to the vertically movable body UD by emitting a light (laser light)—for finding the distance—along the vertical direction toward the first vertical movement reflector 24 provided to the vertically movable platform 11 (second vertical movement reflector 28 for No. 2 crane 3b), and receiving the light reflected by the vertical movement reflector 24. The first laser vertical range finder 23 is configured to detect the vertical position of the vertically movable body UD from the distance measured to the vertically movable body UD. The first laser vertical range finder 23 and the second laser vertical range finder 27 constitute the pair of vertical position detection means. It is possible to use a known sensor as the vertical position detection means, such as a rotation sensor attached to the vertically movable body UD for measuring rotation of a gear engaged to the linear gear teeth or a rack provided in the vertical movement guiding mast 10, a rotation sensor which measures rotation of a gear that engages the chain 16 for the vertical movement, or a contact sensor attached to the vertically movable body UD.

A first laser travel range finder 25 (second laser travel range finder 29 for No. 2 crane 3b) which detects the travel position of the traveling carriage 9 in the travel passage 2 is provided in the traveling carriage 9. A first laser travel range finder 25 is configured to measure the distance between the first laser travel range finder 25 (second laser travel range finder 29 for No. 2 crane 3b) and the traveling carriage 9 in the rack lateral width direction by emitting a distance measuring light (laser light) towards a first travel movement reflector 26 (second travel movement reflector 30 for No. 2 crane 3b) along the rack lateral width direction, receiving the light reflected by the first travel movement reflector 26, and by measuring the elapsed time.

The first travel movement reflector 26 is provided on the ground side and at one end of the travel passage 2, and its location is defined to be the reference position for detecting the travel position of the traveling carriage 9 of the No. 1 crane 3a. The first laser travel range finder 25 is configured to measure the distance from the reference position which is the installation position of the first travel movement reflector 26 to the traveling carriage 9 of the No. 1 crane 3a to detect the travel position of the traveling carriage 9 of No. 1 crane 3a.

The second travel movement reflector 30 is provided at the end that is on the opposite side of the travel passage 2 from where the first travel movement reflector 26 is provided and on the ground side, and its location is defined to be the reference position for detecting the travel position of the traveling carriage 9 of the No. 2 crane 3b. The second laser travel range finder 29 is configured to measure the distance from the reference position which is the installation position of the second travel movement reflector 30 to the traveling carriage 9 of the No. 2 crane 3b to detect the travel position of the traveling carriage 9 of No. 2 crane 3b.

That is, the first laser travel range finder 25 and the second laser travel range finder 29 correspond to the pair of travel position detection means.

The article transfer device 12 includes a support-and-transport portion which supports and transports an article 4 in an article transfer direction which is along the rack fore and aft direction, a base platform which supports this support-and-transport portion for movement in the article transfer direction, and projecting and retracting actuating means for retracting the support-and-transport portion to a retracted position pulled back to the base platform in the article transfer direction and for projecting the support-and-transport portion to a projected position projected outwardly from the base platform 28 in the article transfer direction. It is also possible to use a known structure with an articulated robot arm as the article transfer device 12.

Figure 4:
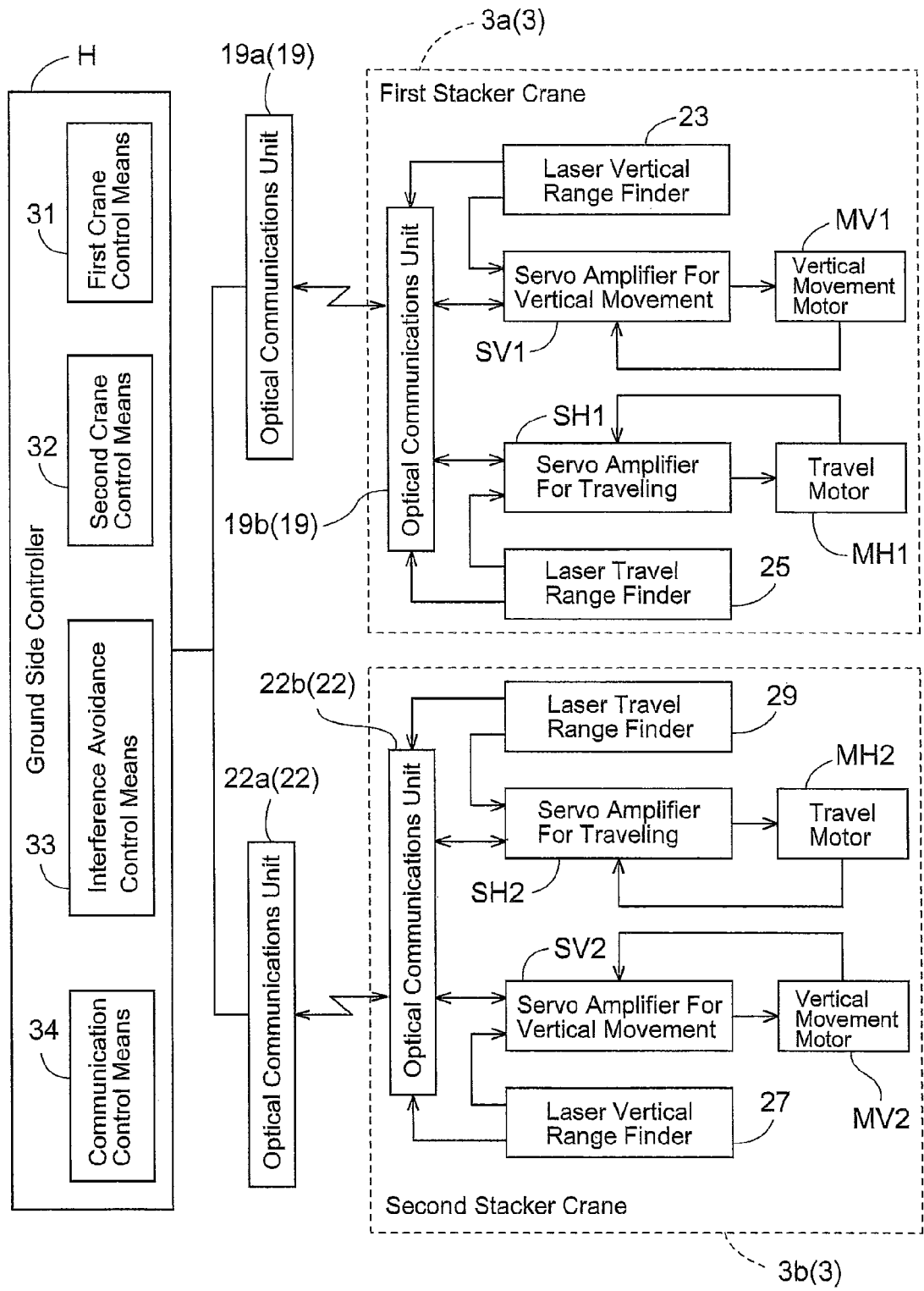
FIG. 4 is a control block diagram.

As shown in the control block diagram in FIG. 4, the ground side controller H as control means to control the operation of the No. 1 crane 3a and No. 2 crane 3b is provided. The various control means, controllers, or other members with control functions described in the present specifications have one or more CPU, memory, and a communication unit, and store the algorithms which execute the functions described in the specification. The ground side controller H is configured to communicate with each of the laser travel range finder and laser vertical range finder and with each of a servo amplifier for traveling and a servo amplifier for vertical movement provided to the stacker crane 3. The communication between the ground side controller H and each of the laser range finders and each servo amplifier in the stacker crane 3 is performed by the wireless communication devices 19, 22 which utilize infrared light.

The wireless communication devices 19, 22 are described next, taking as an example the No. 1 crane wireless communication device 19 which performs infrared communication between the No. 1 crane 3a and the ground side controller H. No. 1 crane wireless communication device 19 consists of a ground side communication unit 19a which is installed in the ground side and at an end of the travel passage 2, and which is connected by wire with the ground side controller H, and a terminal communication unit 19b which is installed in the traveling carriage 9 of the No. 1 crane 3a and which is connected by wire to the laser vertical range finder 23, the laser travel range finder 25, the servo amplifier for vertical movement SV1, and the servo amplifier for traveling SH1 of the No. 1 crane 3a.

Each of the ground side communication unit 19a and the terminal communication unit 19b is provided with an infrared transmitter and a receiver. And the ground side communication unit 19a transmits carrier signals in the infrared light modulated by baseband signals conveying various control information including the target travel position information and the target vertical position information, etc. for No. 1 crane 3a to the terminal communication unit 19b. The terminal communication unit 19b demodulates the received infrared signal and outputs various control information, including the target travel position information, target vertical position information, etc., to the servo amplifier for the vertical movement SV1, and the servo amplifier for traveling SH1. In contrast, the terminal communication unit 19b transmits carrier signals in the infrared light modulated by baseband signals conveying the vertical position information of the vertically movable body UD which is detected by the laser vertical range finder 23, and the travel position information of the traveling carriage 9 of the No. 1 crane 3a which is detected by the laser travel range finder 25, to the ground side communication unit 19a. The ground side communication unit 19a demodulates the received infrared signal, and outputs the vertical position information of the vertically movable body UD of No. 1 crane 3a and the travel position information of the traveling carriage 9 of No. 1 crane 3a to the ground side controller H.

Thus, the ground side controller H can control the operation of the No. 1 crane 3a by performing the two-way communication between the ground side communication unit 19a and the terminal communication unit 19b. Similarly, the ground side controller H can control the operation of the No. 2 crane 3b by performing the two-way communication between the ground side communication unit 22a and the terminal communication unit 22b of the No. 2 crane wireless communication device 22. The modulation and demodulation cycle of the wireless communication devices 19, 22 is sufficiently shorter than the control cycle of the ground side controller H.

And when an operation command for an storage operation or retrieval operation for an individual article unit is issued from a management computer with higher commanding status or from a command input means operated by an operator to input commands, the ground side controller H is configured to control the travel operation of the traveling carriages 9 as well as the vertical movement operation of the vertically movable bodies UD of the No. 1 crane 3a and No. 2 crane 3b to move the article transfer device 12 on the front side of the rack to the target stop position set in advance for each of the storage units 6 or the carry in and out portion 5 in order to move the article transfer device 12 to the storage unit 6 or the carry in and out portion 5 as the transport origin or a transport destination, which is specified by the operation command.

Here, the target stop position is set at a higher position when unloading (that is, handing over) an article 4 to a storage unit 6 or the carry in and out portion 5 than when picking up (that is, receiving) an article 4 from a storage unit 6 or the carry in and out portion 5. And the ground side controller H is configured to control the operation of the projecting and retracting actuating means and the support-and-transport portion of the article transfer device 12 to transfer the article between the article transfer device 12 and the target storage units 6 or the carry in and out portions 5 with the article transfer device 12 positioned at the target stop position.

In this manner, when an operation command is issued, the stacker crane 3 is controlled by the ground side controller H based on the operation command to perform an storage operation and a retrieval operation in which the stacker crane 3 performs an empty transporting operation (which corresponds to the article transporting operation), in which the article transfer device 12 travels carrying and supporting no articles 4, to the transport origin specified by the operation command and, when the transport origin is reached, performs a pick-up transfer operation in which an article 4 is picked up from the transport origin, then, performs an actual transporting operation (which corresponds to the article transporting operation) in which the article transfer device 12 travels to the transport destination carrying and supporting an article 4, and, when the transport destination is reached, performs an unloading transfer operation in which the article 4 is unloaded to the transport destination. Depending on the application, after the storage operation is completed, a return-to-origin operation may be performed in which the stacker crane 3 is returned to the home position HP to wait for a command. (In present embodiment, the home position is set to be the position where the traveling carriage 9 is located at one end in the travel passage 2 in the rack lateral width direction, and the vertically movable body UD is located in the vertical movement lower limit position. See FIG. 1.)

When an operation command is issued, the ground side controller H searches for a stacker crane to which no article transporting operation is assigned (hereafter referred to as unassigned crane). If both of the No. 1 crane 3a and No. 2 crane 3b are cranes with no assignment or unassigned cranes, the stacker crane closer to the transport origin is set to be the stacker crane in charge of carrying out the operation command (hereafter referred to as an assigned crane) based on the transport origin position information specified by the operation command and on the current positions of the No. 1 crane 3a and No. 2 crane 3b. If either of the No. 1 crane 3a and No. 2 crane 3b is an unassigned crane, then the unassigned crane is set to be the assigned crane which takes charge of carrying out the operation command. If both of No. 1 crane 3a and No. 2 crane 3b are assigned cranes, then when either of the stacker cranes becomes an unassigned crane, the unassigned crane is set to be an assigned crane which takes charge of carrying out the operation command. If operation commands are issued one after another when both of the No. 1 crane 3a and No. 2 crane 3b are assigned cranes, the operation command information is stored, and when an assigned crane becomes available, the cranes are assigned sequentially for the operation commands which are stored earlier.

Once the ground side controller H selects the assigned crane, it transmits the target vertical position information and the target vertical position information to the assigned crane at every control cycle (10 ms in the present embodiment), to control the article transporting operation of the assigned crane. The control of the article transporting operation of the stacker crane 3 by the ground side controller H is described next.

While performing the article transporting operation including the empty transporting operation and the actual transporting operation, the ground side controller H issues to the No. 1 crane 3a and No. 2 crane 3b the target travel position information for respective traveling carriages of No. 1 crane 3a and No. 2 crane 3b, and the target vertical position information for each of the vertically movable body of the No. 1 crane 3a and No. 2 crane 3b at every control cycle to control the operation of the stacker crane 3 in order to move the article transfer device 12 from the operation starting position to the operation end position.

The operation starting position is the transport origin for the operation command if the article transporting operation is the actual transporting operation, and is the transport destination for the operation command that was last carried out by the stacker crane if it is the empty transporting operation or the return-to-origin operation. The operation end position is the transport destination for the operation command if the article transporting operation is the actual transporting operation, and is the transport origin for the operation command if it is an empty transporting operation, and is the home position if it is the return-to-origin operation.

Figure 5:
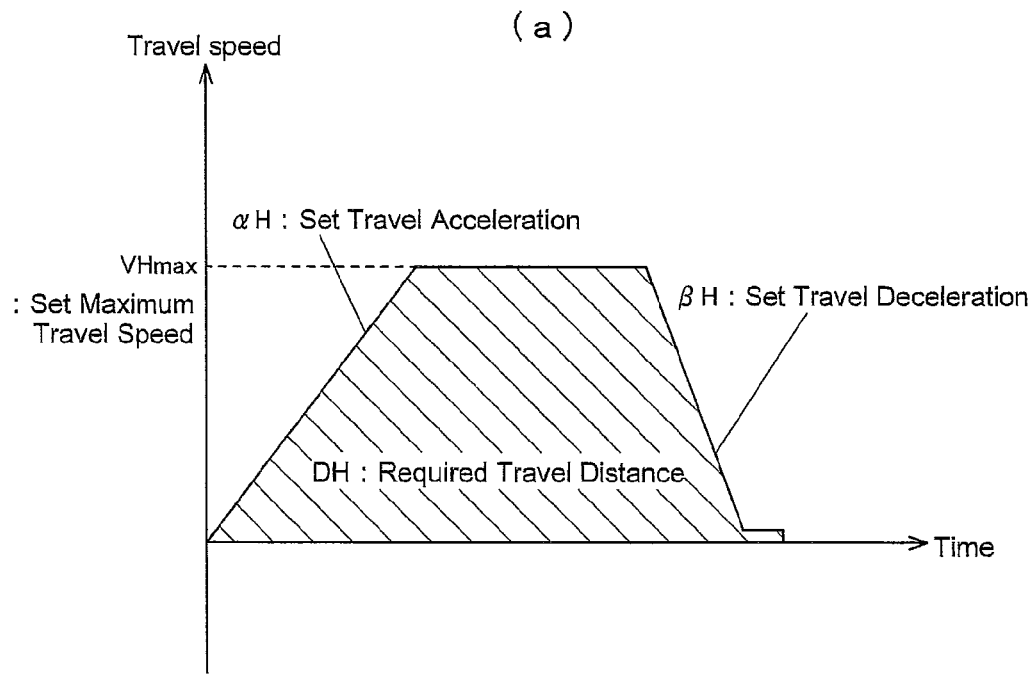
FIG. 5 shows an example of the travel speed pattern and the vertical movement speed pattern.
Figure 5:
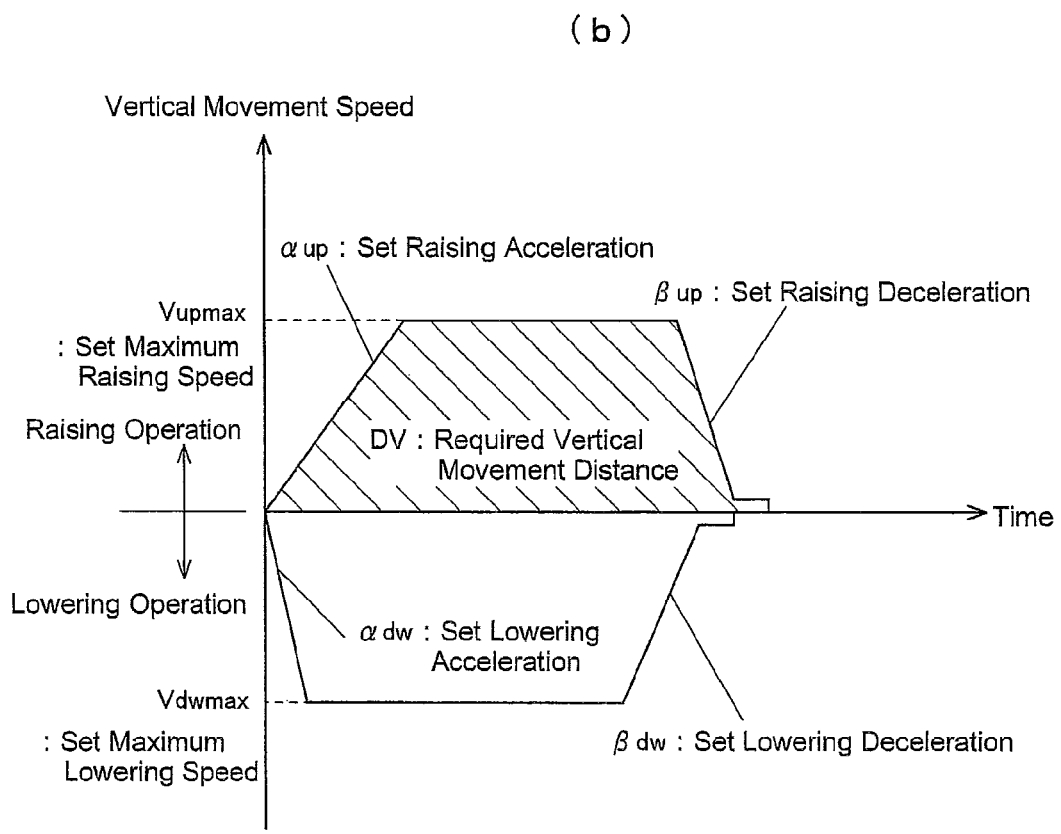

The target travel position information is the target values for the travel position at every control cycle to control the change of the travel position of the traveling carriage 9 so that it carries out the speed change which follows the travel speed change pattern (see FIG. 5(a)) which allows to cover the travel distance DH that is required to travel from the operation starting position to the operation end position in the shortest time possible under the restrictions of the set travel acceleration $\alpha H$, the set maximum travel speed VHmax, and the set travel deceleration $\beta H$.

The target vertical position information, for example, for a raising operation from the operation starting position to the operation end position, is the target values for the vertical position at every control cycle to control the change of the vertical position of the vertically movable body UD so that it carries out the speed change which follows the vertical movement speed change pattern (see FIG. 5(b) in which the one shown with a solid line is the vertical movement speed change pattern for the raising operation) which allows to cover the vertical distance DV that is required to travel from the operation starting position to the operation end position in the shortest time possible under the restrictions of the set raising acceleration $\alpha up$, the set maximum raising speed Vupmax, and the set vertical deceleration $\beta up$. When lowering operation is carried out to move from the operation starting position to the operation end position, the target vertical position information is the target values for the vertical position at every control cycle to control the change of the vertical position of the vertically movable body UD so that it carries out the speed change which follows the vertical movement speed change pattern (see FIG. 5(b) in which the one shown with the dotted line is the vertical movement speed change pattern for the lowering operation) which allows to cover the necessary vertical distance DV in the shortest time possible under the restrictions of the set lowering acceleration αdw, the set maximum lowering speed Vdwmax, and the set vertical deceleration βdw.

The travel position information for the traveling carriage 9 of the No. 1 crane 3a from the first laser travel range finder 25 and the vertical position information for the vertically movable body UD of the No. 1 crane 3a from the first laser vertical range finder 23 are transmitted from the No. 1 crane 3a to the ground side controller H at every control cycle through the No. 1 crane wireless communication device 19. And the ground side controller H updates and generates the target travel position information and the target vertical position information for the No. 1 crane 3a based on the travel position information for the traveling carriage 9 of the No. 1 crane 3a and the vertical position information for the vertically movable body UD of the No. 1 crane 3a such that the traveling carriage 9 of No. 1 crane 3a carries out the speed change that follows the above-mentioned travel speed change pattern and such that the vertically movable body UD of No. 1 crane 3a carries out the speed change that follows the above-mentioned vertical movement speed change pattern, and transmits them to the servo amplifier for the vertical movement SV1 and the servo amplifier for traveling SH1 of No. 1 crane 3a through the No. 1 crane wireless communication device 19.

Similarly, the travel position information for the traveling carriage 9 of the No. 2 crane 3b from the second laser travel range finder 29 and the vertical position information for the vertically movable body UD of the No. 2 crane 3b from the second laser vertical range finder 27 are transmitted from the No. 2 crane 3b to the ground side controller H at every control cycle through the No. 2 crane wireless communication device 22. And the ground side controller H updates and generates the target travel position information and the target vertical position information for the No. 2 crane 3b based on the travel position information for the traveling carriage 9 of the No. 2 crane 3b and the vertical position information for the vertically movable body UD of the No. 2 crane 3b such that the traveling carriage 9 of the No. 2 crane 3b carries out the speed change that follows the above-mentioned travel speed change pattern and such that the vertically movable body UD of No. 2 crane 3b carries out the speed change that follows the above-mentioned vertical movement speed change pattern, and transmits them to the servo amplifier for the vertical movement SV2 and the servo amplifier for traveling SH2 of No. 2 crane 3b through the No. 2 crane wireless communication device 22.

As shown in FIG. 4, the ground side controller H includes first crane control means 31, second crane control means 32, interference avoidance control means 33, and communication control means 34 consisting of computer programs.

The travel position information for the traveling carriage 9 detected by the first laser travel range finder 25 and the motor rotational speed information from the rotary encoder which is provided to the travel motor MH1 are input to the servo amplifier for traveling Sill, and the vertical position information for the vertically movable body UD detected by the first laser vertical range finder 23 and the motor rotational speed information from the rotary encoder which is provided to the vertical movement motor MV1 are input to the servo amplifier for the vertical movement SV1. These servo amplifiers operate in the position control mode. And the servo amplifier for traveling SH1 controls the motor actuating output to the travel motor MH1 of the No. 1 crane 3a such that the travel position of the traveling carriage 9 detected by the first laser travel range finder 25 coincides with the set target position. Similarly, servo amplifier for the vertical movement SV1 controls the motor actuating output to the vertical movement motor MV1 of the No. 1 crane 3a such that the vertical position of the vertically movable body UD detected by the first laser vertical range finder 23 coincides with the set target position.

The first crane control means 31 generates the target travel position information as the target position information for the servo amplifier for traveling SH1 which operates in position control mode at every control cycle based on the target travel position information transmitted from the No. 1 crane 3a, such that the travel position of the traveling carriage 9 coincides with the target travel position. The generated target travel position information is outputted to the ground side communication unit 19a of the No. 1 crane wireless communication device 19 from the communication port which the communication control means 34 controls. Thereby, the travel motor MH1 of No. 1 crane 3a rotates such that the traveling carriage 9 is located at the travel position which the target travel position information indicates.

Similarly, the first crane control means 31 generates the target travel position information as the target position information for the servo amplifier for vertical movement SV1 which operates in position control mode at every control cycle based on the target vertical position information transmitted from the No. 1 crane 3a, such that the vertical position of the vertically movable body UD coincides with the target vertical position. The generated target vertical position information is outputted to the ground side communication unit 19a of the No. 1 crane wireless communication device 19 from the communication port which the communication control means 34 controls. Thereby, the vertical movement motor MV1 of the No. 1 crane 3a rotates such that the vertically movable body UD is located at the vertical position indicated by the target vertical position information.

Thus, because the ground side controller H transmits the target travel position information and the target vertical position information to the servo amplifier for traveling SH1 of the No. 1 crane 3a and the servo amplifier for vertical movement SV1 at every control cycle, the traveling carriage 9 of the No. 1 crane 3a travels such that it is located at the travel position indicated by the target travel position information, and the vertically movable body UD of the No. 1 crane 3a is raised and lowered such that it is located at the vertical position indicated by the target vertical position information.

Although a description of the control configuration of the No. 2 crane 3b will be omitted since it is the same as that of the No. 1 crane 3a, because the ground side controller H similarly transmits the target travel position information and the target vertical position information to the servo amplifier for traveling SH2 of the No. 2 crane 3b and the servo amplifier for vertical movement SV2 at every control cycle, the traveling carriage 9 of the No. 2 crane 3b travels such that it is located at the travel position indicated by the target travel position information, and the vertically movable body UD of the No. 2 crane 3b is raised and lowered such that it is located at the vertical position indicated by the target vertical position information.

The control operation of the ground side controller H is described next.

The ground side controller H manages the travel position of the traveling carriage 9 of the stacker crane 3 and the vertical position of the vertically movable body UD by means of the representative position P of the stacker crane 3 (see FIG. 10) which is the center in the rack lateral width direction (the direction of the path of the travel passage 2 or the travel direction of the traveling carriage 9) of the article support surface in the support-and-transport portion of the article transfer device 12 as seen in the rack back-and-front direction in the travel passage 2. More specifically, the travel position of the traveling carriage 9 is managed as the x-coordinate of the representative position P, and the vertical position of the vertically movable body UD is managed as the y-coordinate of the representative position P in a hypothetical rectangular coordinate system located on the front side of the rack with the rack lateral width direction (the travel direction of the traveling carriage 9) taken as the horizontal axis (x-axis) and the vertical direction of the rack (the vertical movement direction of the vertically movable body UD) taken as the vertical axis (y-axis). In addition, the origin of this hypothetical rectangular coordinate system is defined to be the coordinates of the representative position P when the traveling carriage 9 is located at one end of the travel passage 2, and when the vertically movable body UD is located in the vertical movement lower limit position, that is, when the stacker crane 3 is at the home position HP.

Hereinafter, the travel position of the traveling carriage 9 and the vertical position of the vertically movable body UD will be expressed in terms of the crane center coordinates P (x, y), and the crane center coordinates of the No. 1 crane 3a are expressed as P1 (x1, y1), and the crane center coordinates of No. 2 crane 3b are expressed as P2 (x2, y2). That is, the travel position of the traveling carriage 9 of the No. 1 crane 3a is expressed as x1, and the vertical position of the vertically movable body UD of No. 1 crane 3a is expressed as y1. And the travel position of the traveling carriage 9 of the No. 2 crane 3b is expressed as x2, and the vertical position of the vertically movable body UD of No. 2 crane 3b is expressed as y2. And, the crane center coordinates P (x, y) may sometimes simply be referred to as the position of the stacker crane 3.

Figure 6:
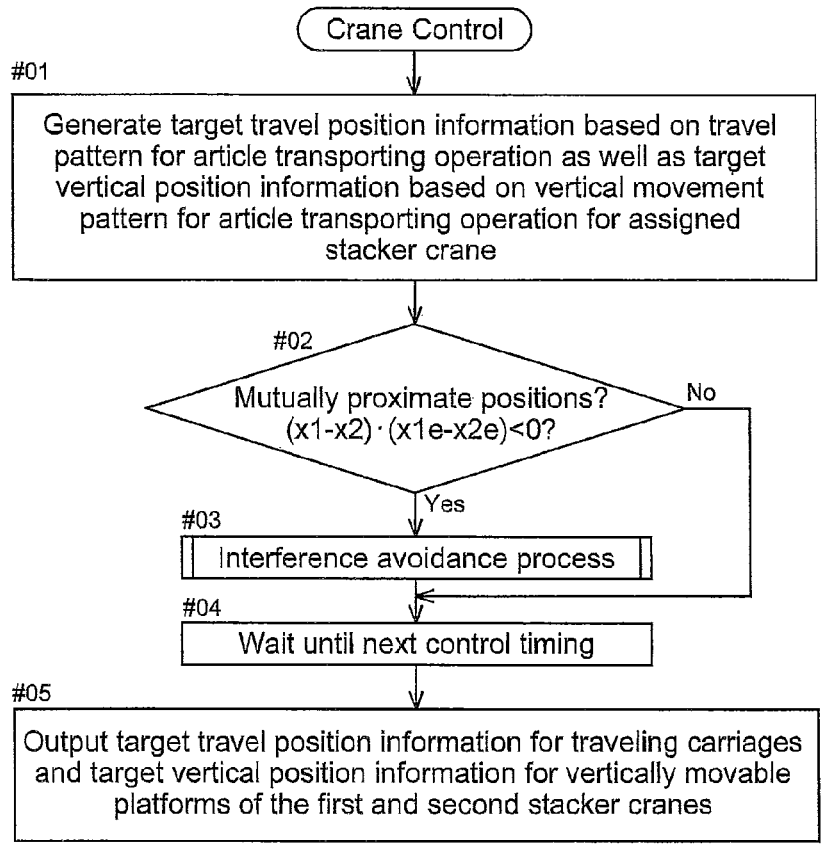
FIG. 6 shows a flow chart for a crane control.

As shown in the flow chart of FIG. 6, when an operation command is issued and an crane is assigned, the control means (one or both of the first crane control means 31 and the second crane control means 32) of the assigned crane generates at #01 the target travel position information based on the travel speed pattern for the article transporting operation and the target vertical position information based on the vertical movement speed pattern for the article transporting operation, which patterns are determined from the operation starting position and the operation end position of the article transporting operation for the assigned crane, and stores them in the output buffer.

At #02, the interference avoidance control means 33 determines whether the No. 1 crane 3a and No. 2 crane 3b are at mutually proximate positions where No. 1 crane 3a and No. 2 crane 3b are predicted to mutually interfere or collide. In this process, assuming that the traveling carriage 9 of the No. 1 crane 3a and the traveling carriage 9 of the No. 2 crane 3b are stopped or caused to stop by decelerating at a set travel deceleration βH at this control timing, it is determined that the respective travel positions of the pair of traveling carriages 9 are at the mutually proximate positions when there is an overlapping portion in the hypothetical braking range covered by each traveling carriage 9 by the time it stops as it moves from the current position P1 (x1, y1) or P2 (x2, y2).

Figure 7:
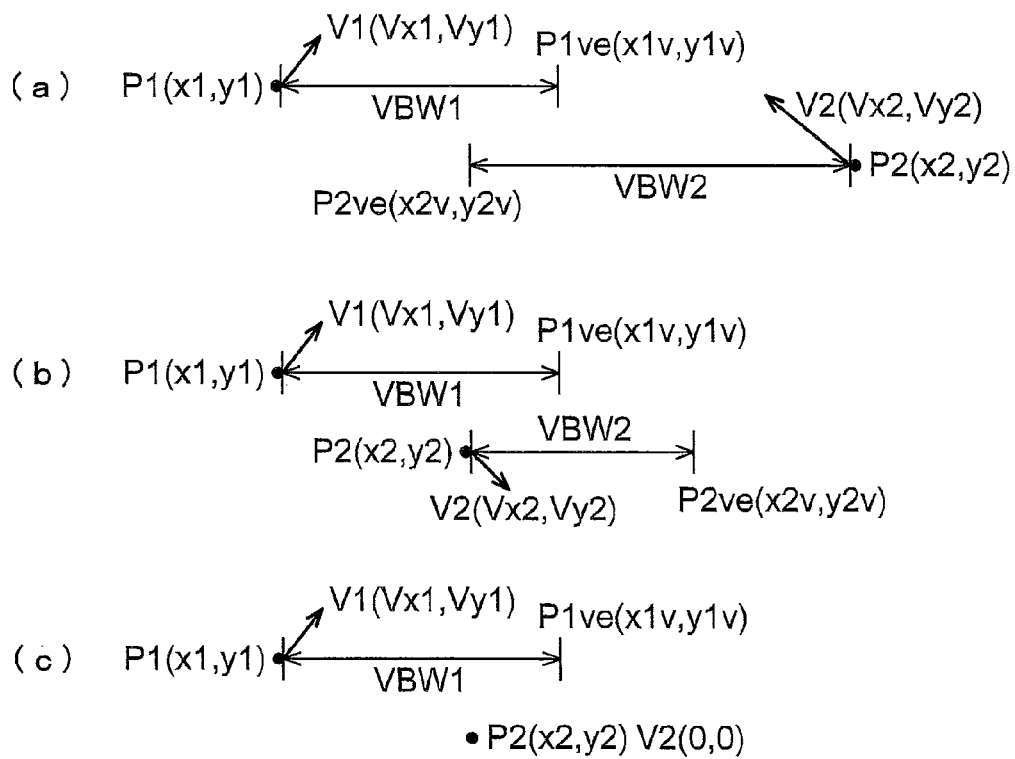
FIG. 7 is diagrams showing mutually proximate positions.

More specifically, as shown in FIG. 7(a), the No. 1 crane hypothetical braking range VBW1 and No. 2 crane hypothetical braking range VBW2, which are hypothetical braking ranges of No. 1 crane 3a and No. 2 crane 3b respectively, overlap at least in part when the No. 1 crane 3a is carrying out the article transporting operation at the position P1 (x1, y1) and at the operation speed V1 (Vx1, Vy1), and the No. 2 crane 3b is carrying out the article transporting operation at the position P2 (x2, y2) and at the operation speed V2 (Vx2, Vy2) at the current control timing t=t1, and when the traveling carriage 9 of No. 1 crane 3a is assumed to slow down by decelerating at the set travel deceleration βH, and stop at the hypothetical stop position P1ve (x1v, y1v), and the traveling carriage 9 of No. 2 crane 3b is assumed to slow down by decelerating at the set travel deceleration βH and stop at the hypothetical stop position P2ve (x2v, y2v), then because they will be in the travel positional relationship in which they approach each other to such an extent that a part of the stacker cranes overlap in the travel direction, no matter how the travel operations of No. 1 crane 3a and No. 2 crane 3b by the article transporting operation change at and after the time t=t1, the vertically movable bodies UD of the No. 1 crane 3a and No. 2 crane 3b may interfere mutually depending on the vertical position of the vertically movable body UD of each stacker crane. Therefore, when there is a possibility that No. 1 crane 3a and No. 2 crane 3b interfere in the subsequent article transporting operation, depending on whether the No. 1 crane hypothetical braking range VBW1 and No. 2 crane hypothetical braking range VBW2 have a mutually overlapping portion, the interference avoidance process described later can be executed without fail. Conversely, when there is a possibility that the No. 1 crane 3a and No. 2 crane 3b may not interfere in the subsequent article transporting operation, the interference avoidance process is not executed at this control timing, determining that it is premature to perform the interference avoidance process.

There are cases as shown in FIGS. 7(b) and (c) in addition to FIG. 7(a), where the No. 1 crane hypothetical braking range VBW1 and No. 2 crane hypothetical braking range VBW2 overlap at least in the part. FIG. 7(a) shows a case where the respective hypothetical braking ranges of No. 1 crane 3a and No. 2 crane 3b overlap when both of No. 1 crane 3a and No. 2 crane 3b perform the article transporting operation as assigned cranes, and when they are traveling in directions in which they face each other. FIG. 7(b) shows a case where the respective hypothetical braking ranges of No. 1 crane 3a and No. 2 crane 3b overlap when both of No. 1 crane 3a and No. 2 crane 3b perform the article transporting operation as assigned cranes, and when they are traveling in the same direction. In FIG. 7(c) shows a case where the No. 2 crane 3b is located in the hypothetical braking range VBW1 of the No. 1 crane 3a when only No. 1 crane 3a is performing the article transporting operation as an assigned crane, and when No. 2 crane 3b is in the standby state as an unassigned crane, that is, when the operation speed V2 of No. 2 crane 3b is zero.

Because the first crane control means 31 of the ground side controller H computes the travel speed Vx1 of the traveling carriage 9 of No. 1 crane 3a from the time rate of change of the detected information from the first laser travel range finder 25, and computes the vertical movement speed Vy1 of the vertically movable body UD of No. 1 crane 3a from the time rate of change of the detected information from the first laser travel range finder 23, and because the second crane control means 32 of the ground side controller H computes the travel speed Vx2 of the traveling carriage 9 of No. 2 crane 3b from the time rate of change of the detected information from the second laser travel range finder 29, and computes the vertical movement speed Vy2 of the vertically movable body UD of No. 2 crane 3b from the time rate of change of the detected information from the second laser travel range finder 27, the interference avoidance control means 33 can refer to the travel speed information for the traveling carriage 9 of the No. 1 crane 3a which the first crane control means 31 computes, and the travel speed information for the traveling carriage 9 of the No. 2 crane 3b which the second crane control means 32 computes in determining whether they are at the mutually proximate positions.

When the No. 1 crane hypothetical braking range VBW1 and No. 2 crane hypothetical braking range VBW2 overlap at least in part, because the positional order in the travel direction of the travel position x1v of the No. 1 crane 3a at the hypothetical stop position P1ve (x1v, y1v) and the travel position x2v of No. 2 crane 3b at the hypothetical stop position P2ve (x2v, y2v) is reversed with respect to the positional order in the travel direction of the travel position x1 of No. 1 crane 3a, and the travel position x2 of No. 2 crane 3b at time t=t1, the determination as to whether there is any overlapping portion in the hypothetical braking range is made in the process at #02 by determining whether the sign of the difference (x1−x2) between the travel position x1 of the No. 1 crane 3a and the travel position x2 of No. 2 crane 3b at time t=t1 is different from the sign of the difference (x1v−x2v) between the travel position x1v of the hypothetical stop position P1ve of the No. 1 crane 3a and the travel position x2v of the hypothetical stop position P2ve of the No. 2 crane 3b.

If it is determined at #02 that the cranes are not at mutually proximate positions, it is determined that the interference avoidance process by the interference avoidance control means 33 does not have to be performed at the control timing and the control proceeds to step #04 where the communication control means 34 waits for the control timing before outputting the target travel position information and the target vertical position information for the assigned crane which the first crane control means 31 and the second crane control means 32 prepared in advance at #01.

If it is determined at #02 that the cranes are at mutually proximate positions, the control proceeds to #03 and the interference avoidance process is executed by the interference avoidance control means 33. Although described later in detail, the crane for the avoidance operation is selected as needed in the interference avoidance process and the target vertical position for the avoidance operation for the crane subject to the avoidance operation is computed. And the target vertical position information stored in the output buffer by the first crane control means 31 and the second crane control means 32 at #01 is overwritten and updated. Since the amount of calculation in this interference avoidance process is such that the calculation can be completed by the subsequent control timing, the control can be returned to #04 by the subsequent control timing. And when the subsequent control timing comes, the communication control means 34 outputs the target vertical position information stored in the output buffer for the avoidance operation for the crane for the avoidance operation and the target vertical position information similarly in the output buffer for the article transporting operation for the other stacker crane 3, to No. 1 crane 3a and No. 2 crane 3b at #05.

Figure 8:
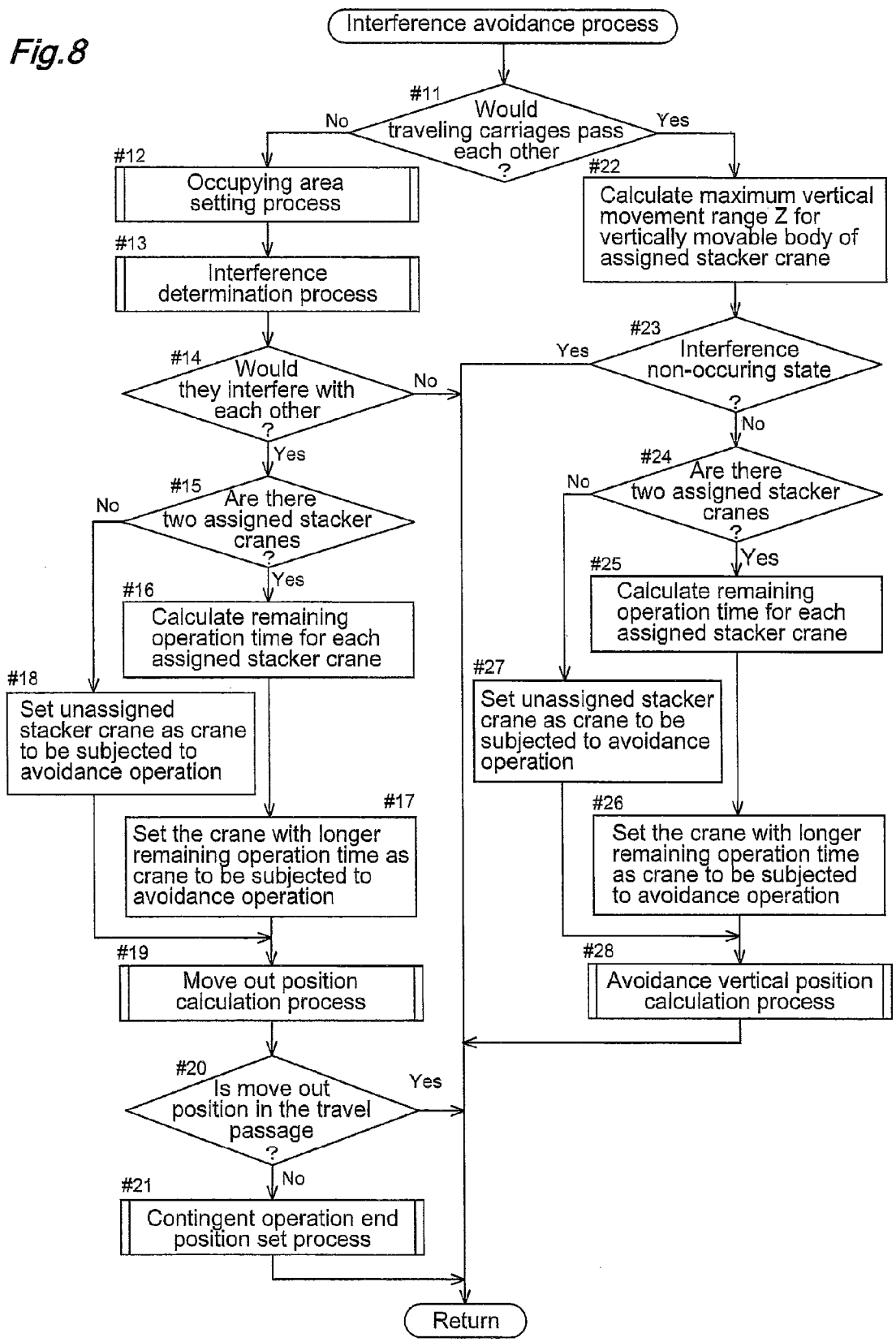
FIG. 8 is a flow chart for the interference avoidance process.

The interference avoidance process executed by the interference avoidance control means 33 is described next with reference to the flow chart shown in FIG. 8.

It is determined whether the traveling carriages 9 pass each other at the current control timing or at a subsequent timing at #11. When both of the No. 1 crane 3a and No. 2 crane 3b are the assigned cranes, it is determined from the current position P1 and the operation end position P1e of the No. 1 crane 3a and from the current position P2 and the operation end position P2e of the No. 2 crane 3b. If the positional order in the travel direction of No. 1 crane 3a and No. 2 crane 3b changes after the completion of the article transporting operation, that is, if (x1−x2) (x1e−x2e)<0 holds, then the cranes pass each other. And if the positional order in the travel direction of No. 1 crane 3a and No. 2 crane 3b does not change after the completion of the article transporting operation, that is, if (x1−x2) (x1e−x2e)>0 holds, then the cranes do not pass each other.

Even when they do not pass each other, there is a possibility that the No. 1 crane 3a and No. 2 crane 3b interfere, for example, when the coordinates of the operation end position P1e of the No. 1 crane 3a coincide with the coordinates of the operation end position of No. 2 crane 3b because the operation end positions of respective article transporting operation are the storage units 6 or the carry in and out portions 5 that are located to face each other across the travel passage 2, or when the operation end position is located in the area in the coordinate plane occupied by a structure, such as the motor cover of the other traveling carriage 9 in a standby state. Therefore, the verification process continues to be performed in the processes at or after #12 to see if the interference between both cranes can occur.

Figure 10:
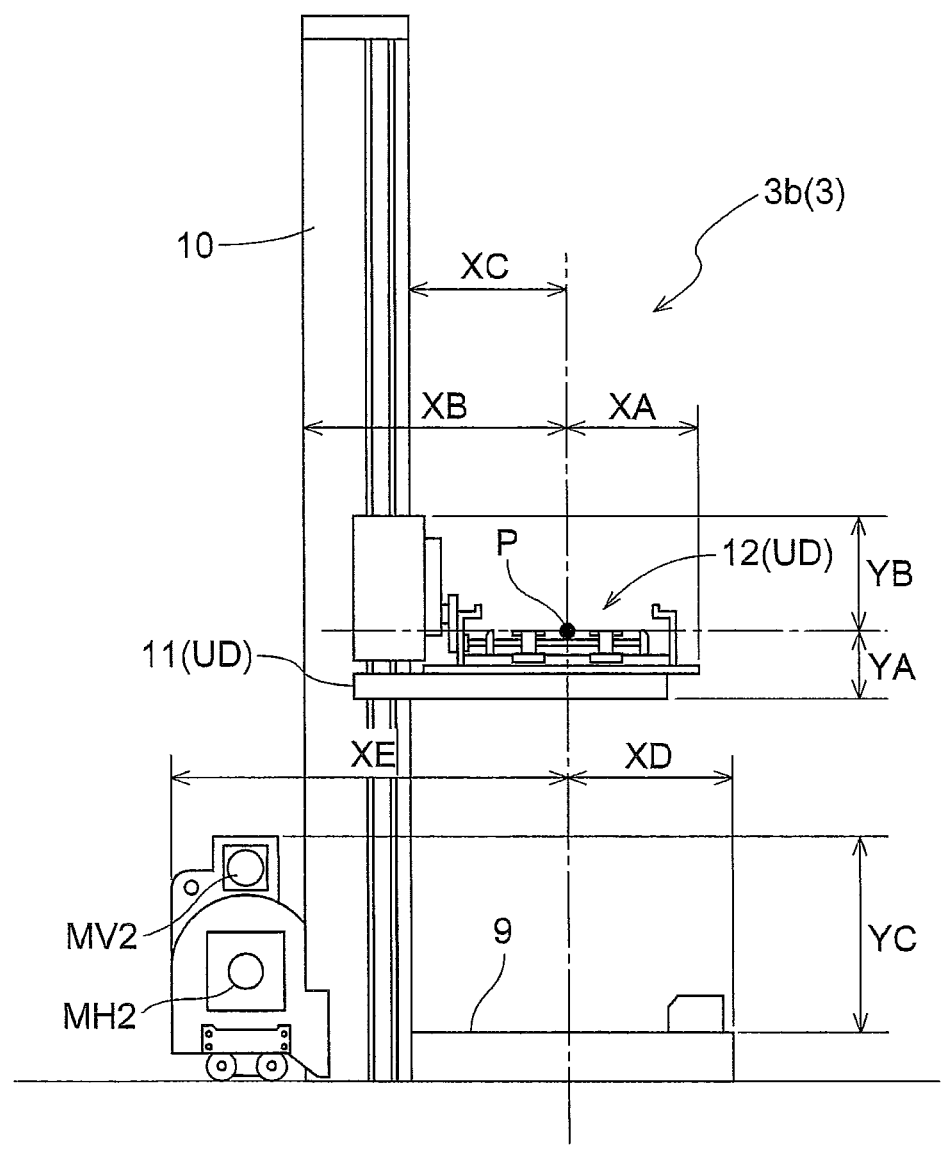
FIG. 10 is a drawing indicating representative dimensions of the stacker crane.

In the occupying area setting process at #12, for an assigned crane, the area in the coordinate plane that is occupied by a structure such as the traveling carriage 9, the vertical movement guiding mast 10, and the vertically movable body UD of the stacker crane 3 is defined as the occupied area when the stacker crane 3 is located at the operation end position. And for the unassigned crane which is in the standby state, the area in the coordinate plane that is occupied by a structure such as the traveling carriage 9, the vertical movement guiding mast 10, and the vertically movable body UD of the stacker crane 3 is defined as the occupied area when the stacker crane 3 is located at the stand-by position. As shown in FIG. 10, in the present embodiment, the representative dimensions of each part with respect to the center at the crane center coordinates P (x, y) of the stacker crane 3 which is used to define the occupied area are stored in advance. For example, the occupied width (XA+XB) in the x direction and the occupied height (YA+YB) in the y direction for the vertically movable body UD, and the occupied width (XE+XD) in the x direction and the occupied height (YC) in the y direction for the traveling carriage 9, etc. are defined with respect to the center at the crane center coordinates P(x, y).

Figure 9:
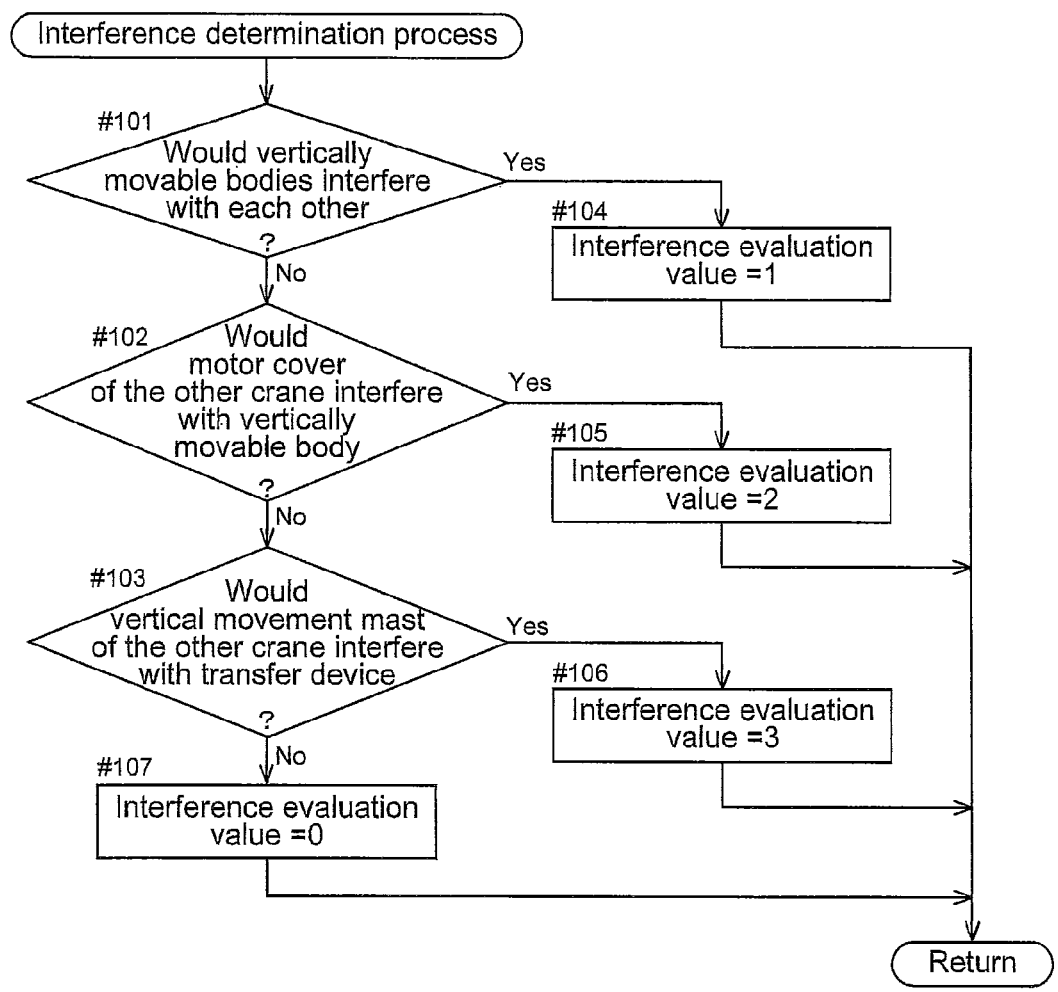
FIG. 9 is a flow chart for the interference determination process.

Returning to FIG. 8, in the interference determination processes at #13, a determination is made as to if there is an overlap between the occupied area of the No. 1 crane 3a and the occupied area of the No. 2 crane 3b at #12, and as to what part if there is, and the interference evaluation value is determined according to the type of the interference. That is, as shown in FIG. 9, it is determined whether the vertically movable bodies UD interfere with each other at #101, if they interfere, the control proceeds to #104 where the interference evaluation value is set to "1". And at #102, it is determined whether the vertically movable body UD and the motor cover of the traveling carriage 9 of the other crane interfere with each other, and if they do, the control proceeds to #105 where the interference evaluation value is set to "2". And at #103, it is determined whether the vertically movable body UD and the vertical movement guide mast 10 of the other crane interfere with each other in an article transfer operation after an article transport operation, and if they do, the control proceeds to #106 where the interference evaluation value is set to "3". If the event is neither of the interference types, the interference evaluation value is set to "0" determining that interference does not occur.

Returning again to FIG. 8, the existence of interference is determined at #14 based on the interference evaluation value determined by the interference determination process at #13. If the interference determination value is "0", the interference avoidance control means 33 will end the interference avoidance process without rewriting the target travel position information and the target vertical position information for the No. 1 crane 3a or No. 2 crane 3b in the output buffer to those for the avoidance operation. And the control of the ground side controller H returns to the main routine in FIG. 6.

If interference evaluation value is "1"~"3" at #14, the control proceeds to #15, and it is determined whether both of No. 1 crane 3a and No. 2 crane 3b are assigned cranes or only one is the assigned crane at the current control timing. If both are performing an article transporting operation as assigned cranes, the remaining operation time for each stacker crane 3 is computed at #16. That is, the longer of the remaining travel operation time and the remaining vertical movement operation time to the operation end position P1e (x1e, y1e) for the No. 1 crane 3a is defined to be the remaining operation time for the No. 1 crane 3a. The remaining travel operation time is the time required to cover the remaining travel distance x1e−x1 from the current position P1 (x1, y1) of No. 1 crane 3a to the operation end position P1e (x1e, y1e), and is computed based on the present operation speed V1 (Vx1, Vy1), the set travel acceleration $\alpha H$, and the set travel deceleration $\beta H$. Similarly, the remaining vertical movement operation time is the time required to cover the remaining vertical distance y1e−y1 from the current position P1 (x1, y1) of No. 1 crane 3a to the operation end position P1e (x1e, y1e), and is computed based on the present operation speed V1 (Vx1, Vy1), the set raising acceleration $\alpha$up or set lowering acceleration $\alpha$dw, the set raising deceleration $\beta$up or set lowering deceleration $\beta$dw.

Because the process to compute the remaining operation time of No. 2 crane 3b is similar to the process for computing the remaining operation time of No. 1 crane 3a, the explanation is omitted.

The remaining operation time of No. 1 crane 3a and the remaining operation time of No. 2 crane 3b are compared at #17 and the assigned crane with the longer remaining time is set as a crane subject to the avoidance operation. Therefore, the assigned crane with the shorter remaining transport time for an article transporting operation can proceed with the article transporting operation. The assigned crane with the longer remaining operation time for the article transporting operation waits at the move-out position computed at #19 at least until the article transporting operation of the other assigned crane is completed and moves away from the operation end position for the article transporting operation.

If only one of the No. 1 crane 3a and No. 2 crane 3b is the assigned crane at the current control timing at #15, the control proceeds to #18, and the unassigned crane is set as to be the crane subject to the avoidance operation. Therefore, the assigned crane which is in charge of an article transporting operation can proceed with the article transporting operation and the unassigned crane which is not in charge of the article transporting operation retreats from the operation end position for the article transporting operation for the other assigned crane to a move-out position computed at #19.

Thus, in the article storage facilities of the present embodiment, the ground side controller H is configured to perform the interference avoidance process by controlling one of the pair of stacker cranes 3. And, when the ground side controller H is causing only one of the pair of stacker cranes 3 to perform an article transporting operation as an assigned stacker crane, the ground side controller H is configured to perform the interference avoidance process by controlling the operation of the stacker crane 3 which is not performing the article transporting operation among the pair of stacker cranes 3. In addition, when the ground side controller H is causing both of the pair of stacker cranes 3 to perform an individual article transporting operation as an assigned stacker crane, the ground side controller H is configured to perform the interference avoidance process by controlling the operation of the assigned stacker crane with the longer remaining operation time for the article transporting operation among the pair of stacker cranes 3.

In the move-out position calculation process at #19, the move-out position for the crane which is subjected to the avoidance operation is determined depending on the value of the interference evaluation value obtained at #13 such that the crane center coordinates P of the crane subjected to the avoidance operation is positioned outside the occupied area of the other stacker crane 3.

Figure 15:
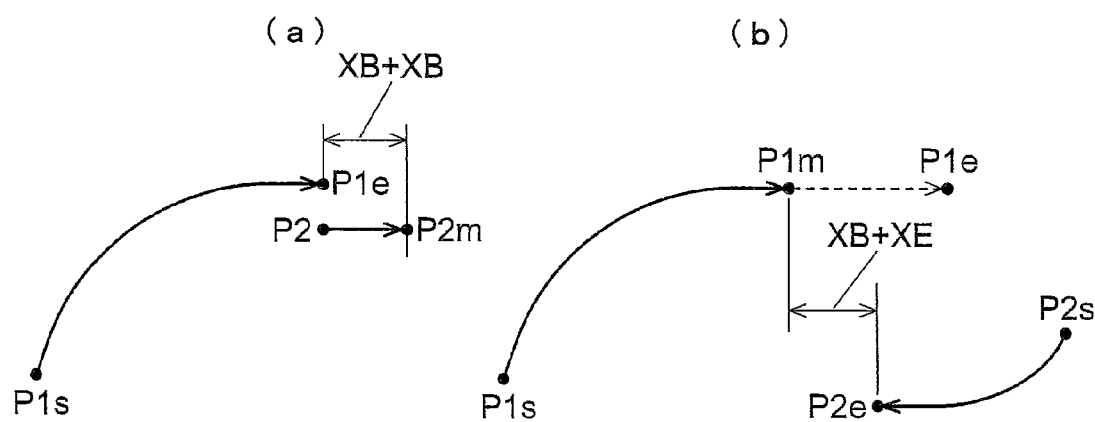
FIG. 15 is a line diagram showing the movements of the stacker cranes in an interference avoidance process when the cranes do not pass each other.

To explain using a concrete example, for example, suppose that the No. 1 crane 3a and No. 2 crane 3b are in the positional relationship shown in FIGS. 1 and 2, and the No. 1 crane 3a is performing an article transporting operation as an assigned crane, and that No. 2 crane 3b is in the standby state as an unassigned crane, and if the operation end position P1e (x1e, y1e) of the No. 1 crane 3a is located in the occupied area of the vertically movable body UD of No. 2 crane 3b in the standby state, then, as shown in FIG. 15(a), the No. 2 crane 3b which is an unassigned crane is set as a crane subjected to the avoidance operation and the move-out position P2m (x2m, y2m) for the No. 2 crane 3b is computed such that the distance in the x direction between the crane center coordinates P1e at the operation end position of the No. 1 crane 3a and the crane center coordinates P2 for the No. 2 crane 3b is separated by "XB+XB" to place the No. 1 crane 3a and No. 2 crane 3b in the relationship shown in FIG. 6(b). Incidentally, for the situation shown in FIG. 15(a), since the crane subjected to the avoidance operation only moves in the travel direction from the standby state, its position is simply moved to P2m (x1e+2*XB, y2).

And, if both of No. 1 crane 3a and No. 2 crane 3b are performing the article transporting operation as an assigned crane, for example, and if the operation end position P1e (x1e, y1e) of the No. 1 crane 3a is located in the occupied area of the traveling carriage 9 of the No. 2 crane 3b at the operation end position P2e (x2e, y2e), then, the move-out position P1m (x1m, y1m) for the No. 1 crane 3a is computed such that the distance in the x direction (the travel direction of the traveling carriage 9 or the rack lateral width direction) between the crane center coordinates P1e of the No. 1 crane 3a at the operation end position and the crane center coordinates P2e of the No. 2 crane 3b at the operation end position is separated by the distance "XB+XE" as shown in FIG. 15(b). The trajectory including the portion shown with the dashed line is the trajectory of the No. 1 crane 3a when it did not perform the interference avoidance operation but instead proceeded to the end of the article transporting operation.

Since the stacker crane 3 with longer remaining operation time was No. 1 crane 3a at the time when the respective travel position of the traveling carriage 9 of each stacker crane 3 has become the mutually proximate distance in the article transporting operations by No. 1 crane 3a and No. 2 crane 3b shown in FIG. 15(b), No. 1 crane 3a is set or selected as an assigned crane to be subjected to the avoidance operation.

Thus, the ground side controller H is configured to perform the interference avoidance process in which the operations of the pair of stacker crane 3 are controlled to position the pair of traveling carriages 9 and the pair of vertically movable bodies UD in the non-interfering positions where the pair of stacker cranes 3 would not or will not interfere with each other, based on the detected information from the first laser travel range finder 25, the second laser travel range finder 29, the first laser vertical range finder 23, and the second laser vertical range finder 27, when respective travel positions of the pair of traveling carriages 9 are at the mutually proximate positions.

Returning to FIG. 8, it is determined at #20 whether the move-out position computed at #19 is a position to which the stacker crane 3 subjected to the avoidance operation can actually be moved, or more specifically, whether the x-coordinate of the move-out position is within the travel passage 2. If the x-coordinate of the move-out position is within the travel passage 2, the move-out position is set as an operation end position to perform the avoidance operation on the crane subjected to the avoidance operation to move it to the move-out position, after which, the control leaves the interference avoidance process and returns to the main routine in FIG. 7. Thus, at the subsequent control timings, the first crane control means 31 or the second crane control means 32 generates, at #01 in FIG. 6, information for the avoidance operation (the target travel position information and target vertical position information which should be outputted at the control timing in order to position the crane subjected to the avoidance operation in the move-out position) as the target travel position information and the target vertical position information for the crane subjected to the avoidance operation.

If the x-coordinate of the move-out position is outside the range of the travel passage 2, the control proceeds to #21, and a contingent operation end position set process is executed. This process is to provide a dummy operation end position to cause the crane subjected to the avoidance operation to travel in the direction opposite to the travel direction for the move-out position computed at #19. Because the operation end position has been determined, at the subsequent control timings, the first crane control means 31 or the second crane control means 32 generates information for the avoidance operation (the target travel position information and target vertical position information which should be outputted at the control timing in order to position the crane subjected to the avoidance operation in the operation end position determined by the contingent operation end position set process) as the target travel position information and the target vertical position information for the crane subjected to the avoidance operation. In so doing, the crane subjected to the avoidance operation performs a contingent article transporting operation which is not based on the operation command. In this way, the crane subjected to the avoidance operation can avoid interference with the other stacker crane by traveling toward an operation end position different from the move-out position computed before.

A case where it is determined at #11 that the traveling carriages 9 pass each other is described next. If the vertical position of the vertically movable body UD of the No. 1 crane 3a and the vertical position of the vertically movable body UD of the No. 2 crane 3b are not separated in the vertical direction by a distance greater than or equal to a required separating distance y_CL defined as a separating distance which allows the pair of stacker cranes 3 to pass and move without interfering when they pass each other, the vertically movable bodies UD will interfere with each other when No. 1 crane 3a and No. 2 crane 3b pass each other. To this end, the interference avoidance control means 33 derives the maximum vertical movement range Z which each vertically movable body UD can cover by being raised or lowered in the remaining time T from the time the travel positions of the traveling carriages 9 of the No. 1 crane 3a and No. 2 crane 3b become the mutually proximate positions until they reach the assumed interference travel positions in the processes at and subsequent to #22. And the No. 1 crane 3a and No. 2 crane 3b are allowed to pass each other and move without interfering mutually by changing the vertical movement operation of the vertically movable body UD from the vertical movement operation for an article transporting operation from the time the travel position of each traveling carriage 9 reaches the mutually proximate position, except when the maximum vertical movement range Z for each traveling carriage 9 of No. 1 crane 3a and No. 2 crane 3b is mutually separated by a distance greater than the required separating distance y_CL so that they do not mutually overlap, or when the interference range, which extends by the required separating distance y_CL in both vertical directions from the vertical position of the vertically movable body UD of the unassigned crane, does not overlap with the maximum vertical movement range Z for the vertically movable body UD of the assigned stacker crane. In the present embodiment, the required separating distance y_CL is set to be the constant value "YA+YB" regardless of whether the article transfer device 12 is supporting an article 4 (whose height is less than YB). The processes at and after #22 are described next.

First, the assigned crane computes the maximum vertical movement range Z by which the vertically movable body UD can be raised or lowered in the remaining time T from the current control timing at #22. The remaining time T is the amount of time from the time respective travel positions of the traveling carriages 9 of the No. 1 crane 3a and No. 2 crane 3b reach the mutually proximate positions until the time they reach the assumed interference travel positions at which the pair of vertically movable bodies are assumed to interfere each other when the traveling carriages 9 in the travel operations are decelerated at the set travel deceleration βH.

Different assumed interference travel positions are used depending on how the No. 1 crane 3a and No. 2 crane 3b pass each other. For example, if the positional order of the No. 1 crane 3a and No. 2 crane 3b is reversed from the original order shown in FIGS. 1 and 2 as the result of the two passing each other, the travel positions of the traveling carriages 9 are the assumed interference travel positions when each traveling carriage 9 of the No. 1 crane 3a and No. 2 crane 3b satisfies the relative travel positional relationship shown in FIG. 11(b), that is, the travel positional relationship where the x-coordinate x2 of the crane center coordinates P2 of the No. 2 crane 3b is greater than the x-coordinate x1 of the crane center coordinates P1 of the No. 1 crane 3a by the distance "XB+XB".

Figure 11:
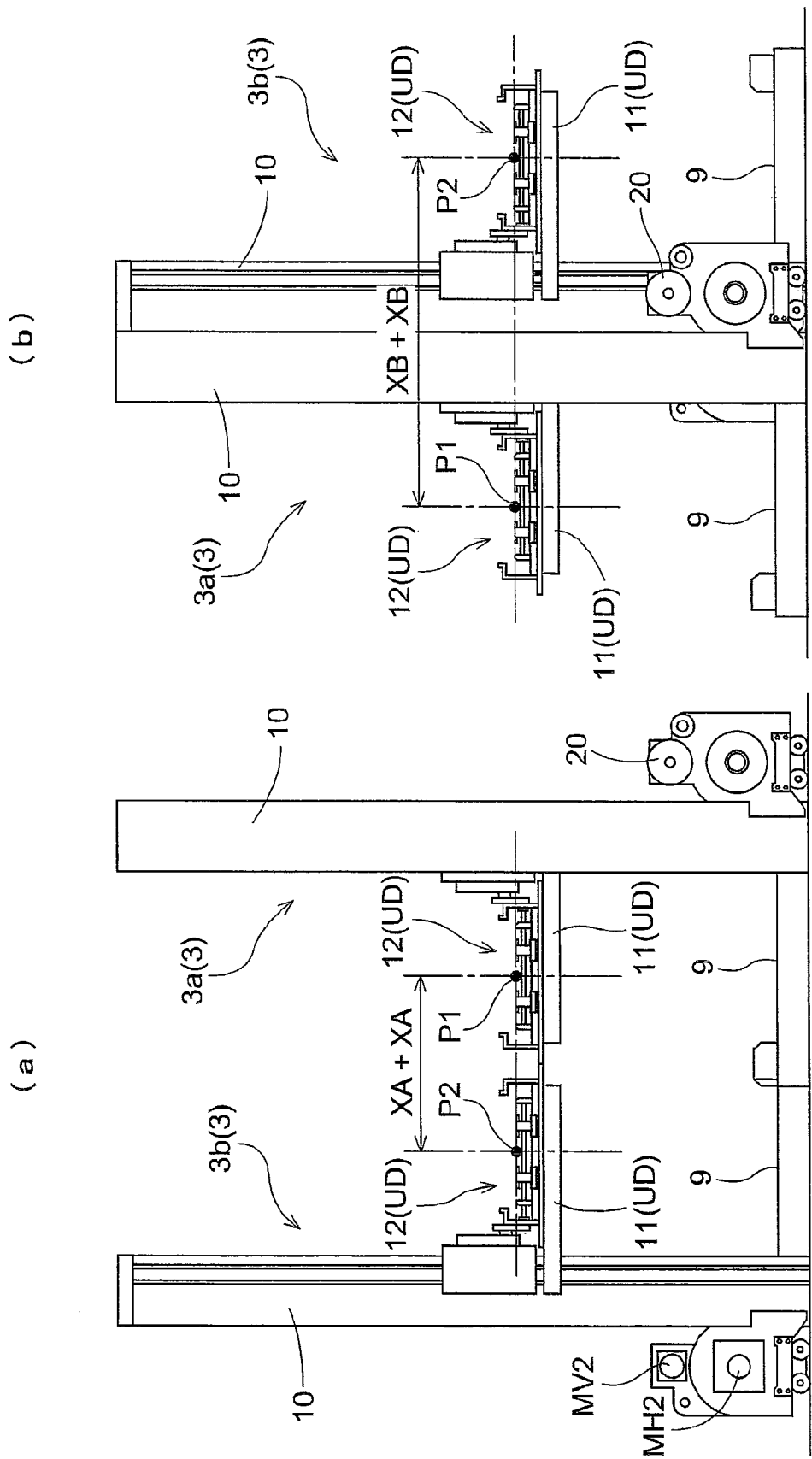
FIG. 11 is a drawing for explaining the assumed interference travel positions of the stacker cranes.

And if the positional order of the No. 1 crane 3a and No. 2 crane 3b is changed from the order which is opposite from the order shown in FIGS. 1 and 2 to the positional order shown in FIGS. 1 and 2 as the result of the two passing each other, the travel positions of respective traveling carriages 9 are the assumed interference travel positions when each traveling carriage 9 of the No. 1 crane 3a and No. 2 crane 3b satisfies the relative travel positional relationship shown in FIG. 11(a), that is, the travel positional relationship where the x-coordinate x1 of the crane center coordinates P1 of the No. 1 crane 3a is greater than the x-coordinate x2 of the crane center coordinates P2 of the No. 2 crane 3b by the distance "XA+XA".

By defining the remaining time T to be the time interval from the time they reach the mutually proximate positions until they reach the assumed interference travel positions when the cranes are decelerated at the set travel deceleration βH, the maximum vertical movement range Z is estimated to be the greatest value possible, assuming a travel operation which requires the longest time after the cranes reach the mutually proximate positions until they reach the assumed interference travel positions among the travel operations for an article transporting operation.

At #23, it is determined whether the interference non-occurring state exists in which the pair of stacker cranes 3 would not or will not interfere with each other. That is, it is determined whether the vertically movable bodies UD of the No. 1 crane 3a and No. 2 crane 3b interfere with each other assuming that the assigned crane continues to proceed with the article transporting operation in the current state.

More specifically, when the ground side controller H is causing the pair of stacker cranes to perform article transporting operations as assigned cranes through the first crane control means 31 and the second crane control means 32, interference avoidance control means 33 determines that the interference non-occurring state exists in which the pair of stacker cranes do not interfere with each other if the maximum vertical movement range Z1 of the vertically movable body UD of the No. 1 crane 3a and the maximum vertical movement range Z2 of the vertically movable body UD of the No. 2 crane 3b do not mutually overlap because they are separated from each other by a distance greater than the required separating distance y_CL. And when the ground side controller H is causing only one of the pair of stacker cranes to perform an article transporting operation as an assigned crane through the first crane control means 31 or the second crane control means 32, the interference avoidance control means 33 determines that the interference non-occurring state exists in which the pair of stacker cranes do not interfere with each other, if the interference range—which extends in both vertical directions along the vertical movement direction about the vertical position of the vertically movable body UD of the other stacker crane 3 by the required separating distance y_CL—does not overlap with the maximum vertical movement range Z for the vertically movable body UD of the assigned crane.

Figure 12:
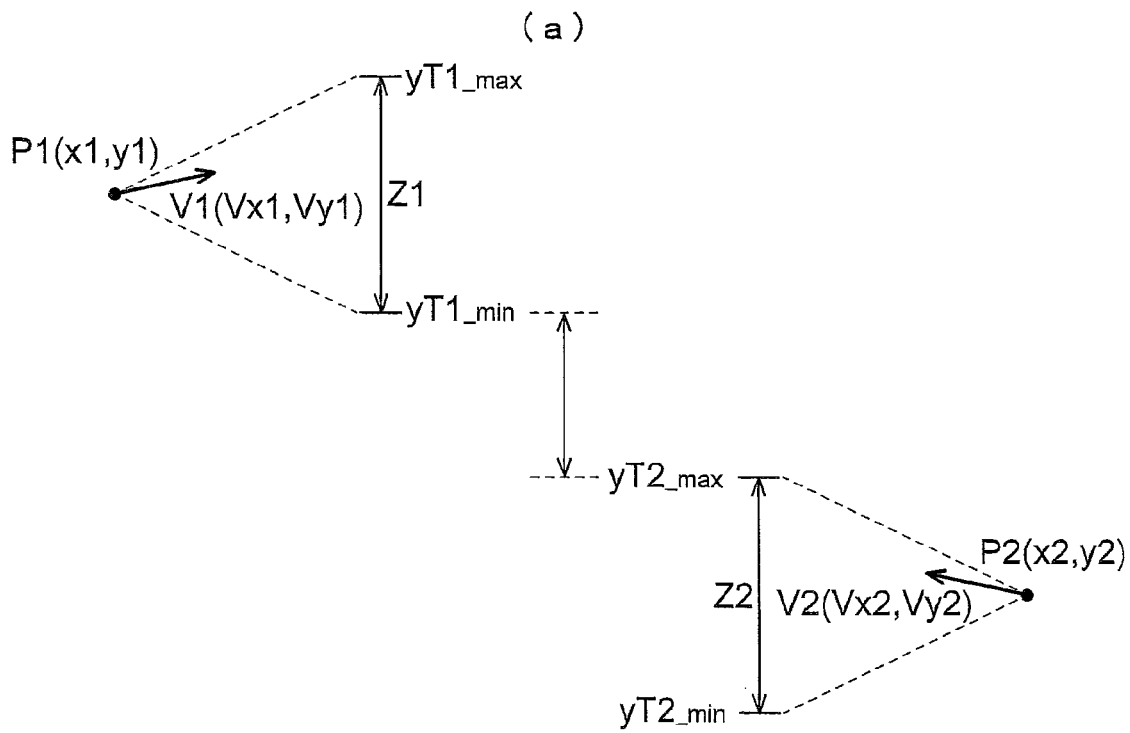
FIG. 12 is a drawing showing a non-interfering state.
Figure 12:
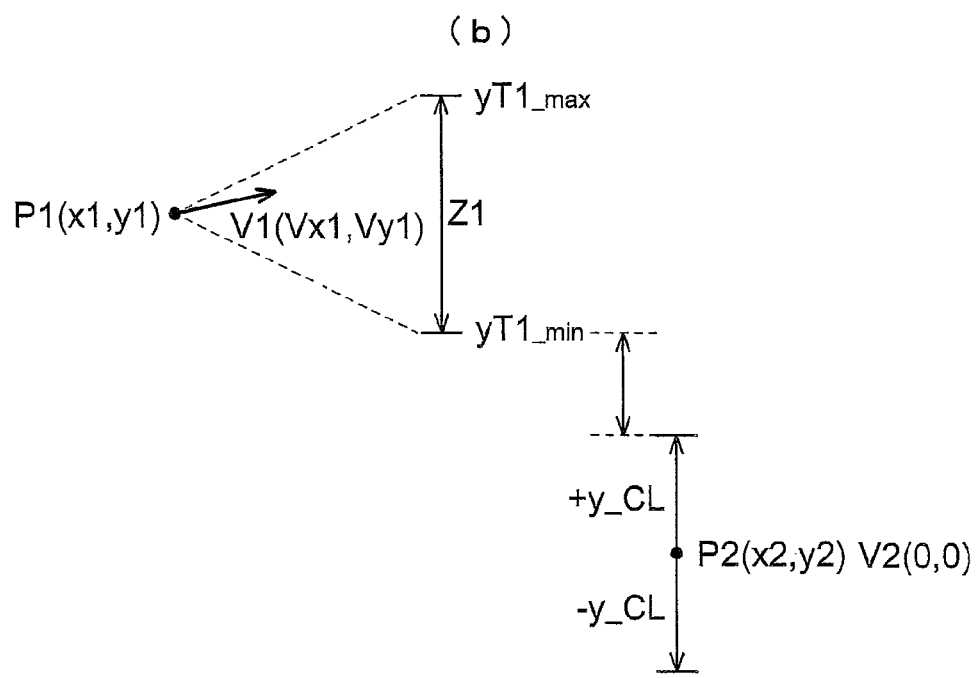

For example, as shown in FIG. 12(a), if both of the No. 1 crane 3a and No. 2 crane 3b are performing article transporting operations as assigned cranes, and if the No. 1 crane 3a is operating at the position P1 (x1, y1) with speed V1 (Vx1, Vy1), and the No. 2 crane 3b is operating at the position P2 (x2, y2) with speed V2 (Vx2, Vy2), then it is determined that the interference non-occurring state exists if the vertical movement lower limit position yT1_min which is the lower end of the maximum vertical movement range Z1 of the vertically movable body UD of the No. 1 crane 3a is located above the vertical movement upper limit position yT2_max which is the upper end of the maximum vertical movement range Z2 of the vertically movable body UD of the No. 2 crane 3b by a distance which is greater than or equal to the required separating distance y_CL (i.e., when yT1_min>yT2_max+y_CL holds), or, although not shown, if the vertical movement lower limit position yT2_min which is the lower end of the maximum vertical movement range Z2 of the vertically movable body UD of the No. 2 crane 3b is located above the vertical movement upper limit position yT1_max which is the upper end of the maximum vertical movement range Z1 of the vertically movable body UD of the No. 1 crane 3a by a distance greater than or equal to the required separating distance y_CL (i.e., when yT2_min>yT1_max+y_CL holds) at the current control timing.

And, as shown in FIG. 12(b), if only the No. 1 crane 3a is performing an article transporting operation as an assigned crane and No. 2 crane 3b is stopped in the standby state as an unassigned crane and if the No. 1 crane 3a is operating at the position P1 (x1, y1) with speed V1 (Vx1, Vy1) and the No. 2 crane 3b is stopped at the position P2 (x2, y2) with speed V2 (0, 0), then it is determined that the interference non-occurring state exists if the vertical movement lower limit position yT1_min which is the lower end of the maximum vertical movement range Z1 of the vertically movable body UD of the No. 1 crane 3a is located above the interference upper limit position y2+y_CL which is the upper end of the interference range of the vertically movable body UD of the No. 2 crane 3b (i.e., when yT1_min>y2+y_CL holds), or, although not shown, if the vertical movement upper limit position yT1_max which is the upper end of the maximum vertical movement range Z1 of the vertically movable body UD of the No. 1 crane 3a is located below the interference lower limit position y2−y_CL which is the lower end of the interference range for the vertically movable body UD of the No. 2 crane 3b (i.e., when yT1_max<y2−y_CL holds) at the current control timing.

If it is determined that the interference non-occurring state exists at #23, the interference avoidance control means 33 ends the interference avoidance process without rewriting the target vertical position information for the No. 1 crane 3a and the No. 2 crane 3b with that for the avoidance operation and the control of the ground side controller H is returned to the main routine in FIG. 6.

Thus, the ground side controller H is configured to control the vertical movement operations of the pair of vertically movable body UD such as to perform an article transporting operation without controlling the vertical movements of the pair of vertically movable body UD using the interference avoidance process if it is determined that the interference non-occurring state exists, and so as to perform the article transporting operation by controlling the pair of vertically movable body UD by the interference avoidance process if it is determined that the interference non-occurring state does not exist in the interference avoidance process.

If it is not determined that the interference non-occurring state exists at #23, the processes at #24-#26 are executed to assign one of the No. 1 crane 3a and the No. 2 crane 3b as the crane to be subjected to the avoidance operation. Since the processes at #24-#26 are identical to the processes at #16-#18, descriptions for these steps are omitted.

Once the crane to be subjected to the avoidance operation is determined, an avoidance vertical position calculation process is executed by the interference avoidance control means 33 to generate avoidance vertical position information for raising and lowering the vertically movable body UD of the subject crane in the vertical movement operation for the avoidance operation at #28. After the interference avoidance control means 33 overwrites the existing information in the output buffer with the avoidance vertical position information, obtained in this calculation process for the crane to be subjected to the avoidance operations, as the target vertical position information for the stacker crane, it ends the interference avoidance process, and the control of the ground side controller H is returned to the main routine in FIG. 7.

Figure 13:
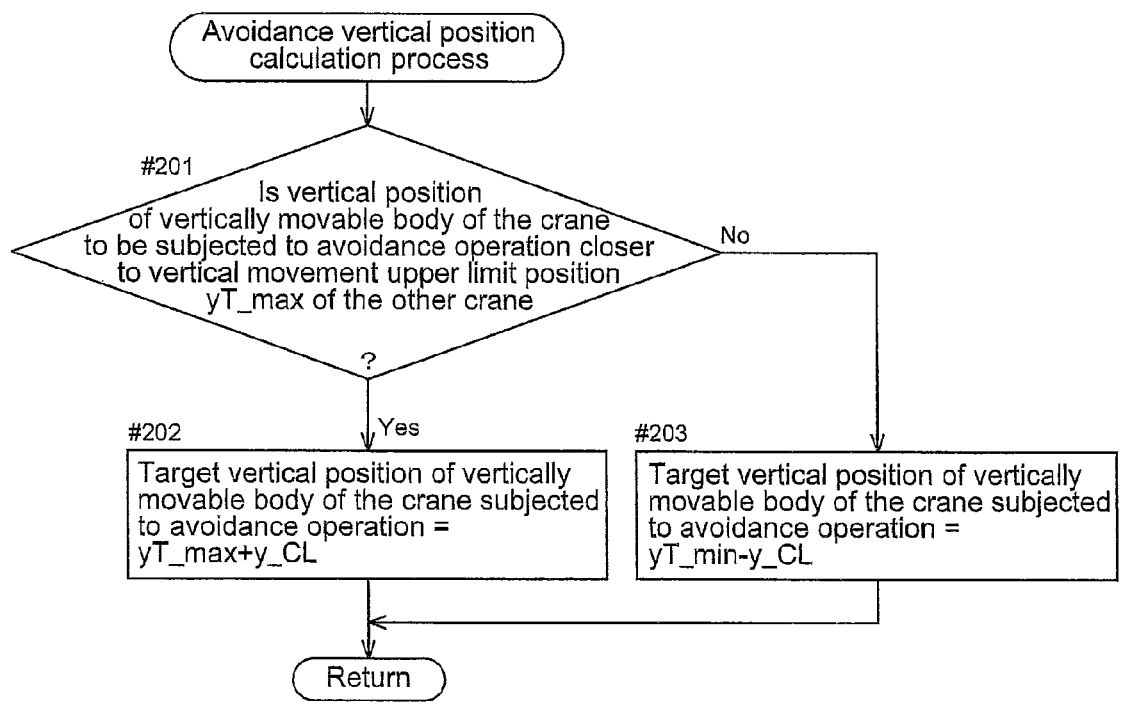
FIG. 13 is a flow chart for an avoidance vertical position calculation process.

The avoidance vertical position calculation process is described next with reference to the flow chart shown in FIG. 13. It is determined at #201 whether the vertical position of the vertically movable body UD of the crane subjected to the avoidance operation at the current control timing is closer to the vertical movement upper limit position yT_max which is the upper end of the maximum vertical movement range of the other stacker crane 3, or to the vertical movement lower limit position yT_min which is the lower end of the range. If it is closer to the vertical movement upper limit position yT_max, the control proceeds to step #202, and the target vertical position of the vertically movable body UD of the crane subjected to the avoidance operation is set to yT_max+y_CL. If it is closer to the vertical movement lower limit position yT_min, the control proceeds to step #203, and the target vertical position of the vertically movable body UD of the crane subjected to the avoidance operation is set to yT_min−y_CL.

Figure 14:
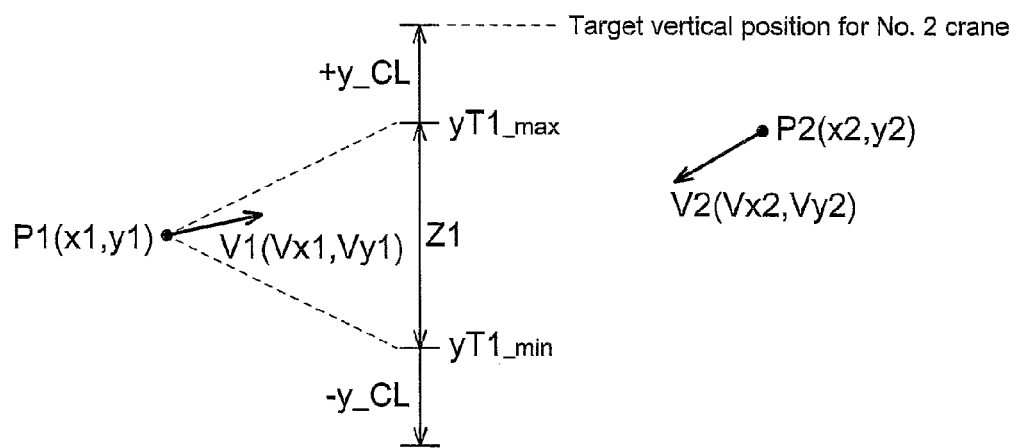
FIG. 14 is a drawing for explaining an example of a setting of the target vertical position by the avoidance vertical position calculation process.

For example, as shown in FIG. 14, if the No. 1 crane 3a is performing an article transporting operation as an assigned crane and the No. 2 crane 3b is the crane to be subjected to the avoidance operation, and if the No. 1 crane 3a is operating at the position P1 (x1, y1) with speed V1 (Vx1, Vy1) at the current control timing, then the target vertical position of the vertically movable body UD of the No. 2 crane 3b is set to yT_max+y_CL if the vertical position y2 of the vertically movable body UD of No. 2 crane 3b is closer to the vertical movement top end position yT1_max which is the upper end of the maximum vertical movement range Z1 of the vertically movable body UD of the No. 1 crane 3a. And, although not shown, if the vertical position y2 of the vertically movable body UD of the No. 2 crane 3b is closer to the vertical movement lower limit position yT1_min which is the lower end of the maximum vertical movement range Z1 of the vertically movable body UD of the No. 1 crane 3a, then the target vertical position of the vertically movable body UD of the No. 2 crane 3b is set to yT_min−y_CL.

In this manner, when article transporting operations are performed in which the traveling carriages 9 of the No. 1 crane 3a and the No. 2 crane 3b pass each other, any interference between the No. 1 crane 3a and the No. 2 crane 3b can be avoided because the stacker crane 3 subjected to the avoidance operation performs a travel operation and a vertical movement operation for avoiding interference in which each vertically movable body UD is raised or lowered to the vertical positions for passing each other which are spaced apart in the vertical direction by a distance greater than or equal to the required separating distance y_CL which is defined to be a separating distance which allows the No. 1 crane 3a and No. 2 crane 3b to pass each other without interfering each other. That is, the ground side controller H is configured to execute or perform the interference avoidance vertical movement process as an interference avoidance process.

Figure 16:
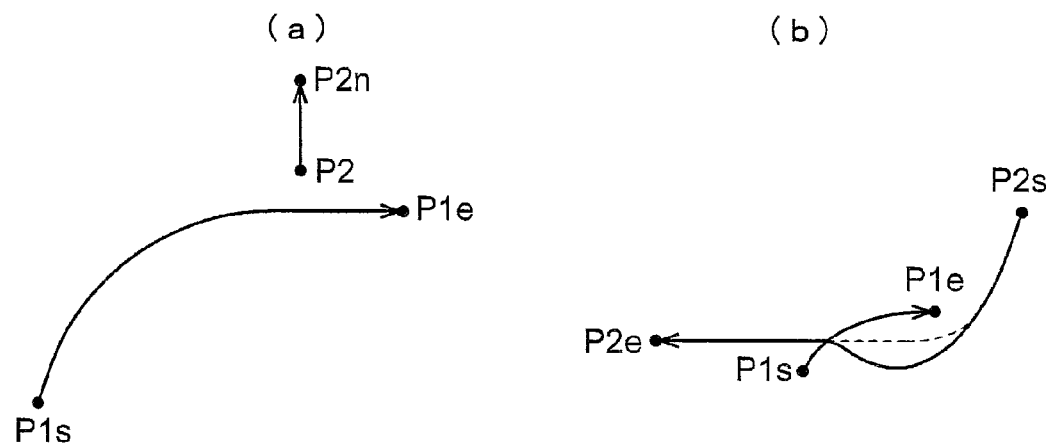
FIG. 16 is a line diagram showing the movements of the stacker cranes in an interference avoidance process when the cranes pass each other.

For example, as shown in FIG. 16(a), if only the No. 1 crane 3a, as an assigned crane, is performing an article transporting operation from the operation starting position P1s to the operation end position P1e, and if No. 2 crane 3b is stopped in the standby state as an unassigned crane, the No. 2 crane 3b which is the unassigned crane is determined to be the crane to be subjected to the avoidance operation when the travel positions of the traveling carriage 9 of the No. 1 crane 3a and the No. 2 crane 3b reach the mutually proximate positions; and, the vertically movable body UD of the No. 2 crane 3b performs a vertical movement operation for the avoidance operation to the vertical position P2n (x2, y2n), which is changed only in the y coordinate from the standby position P2 (x2, y2), for passing each other as a non-interfering position to avoid any interference between the No. 1 crane 3a and No. 2 crane 3b.

And, as shown in FIG. 16(b), if both of the No. 1 crane 3a and No. 2 crane 3b are performing article transporting operations as assigned cranes from the operation starting positions P1s and P1s to the operation end positions P1e and P2e, No. 2 crane 3b with the longer remaining operation time is set or determined to be the crane for the avoidance operation when the travel position of the traveling carriage 9 of the No. 1 crane 3a and No. 2 crane 3b reach the mutually proximate positions; and, any interference between the No. 1 crane 3a and No. 2 crane 3b is avoided by causing the vertically movable body UD of No. 2 crane 3b to perform a vertical movement operation which is different from the vertical movement operation for an article transporting operation in order to be raised or lowered to be at the vertical position for passing each other as a non-interfering vertical position. In the drawing, the trajectory containing a portion shown with a dotted line is one in which the No. 2 crane 3b performs only the vertical movement operation for an article transporting operation, and not the vertical movement operation for avoiding interference.

Embodiment 2

The interference avoidance process including the mutual avoidance vertical movement process performed by the interference avoidance control means 33 is described next with reference to the flow chart shown in FIG. 17. Since the steps #1 to #23 in FIG. 17 are identical to those in FIG. 8, descriptions for these steps are omitted here.

Figure 17:
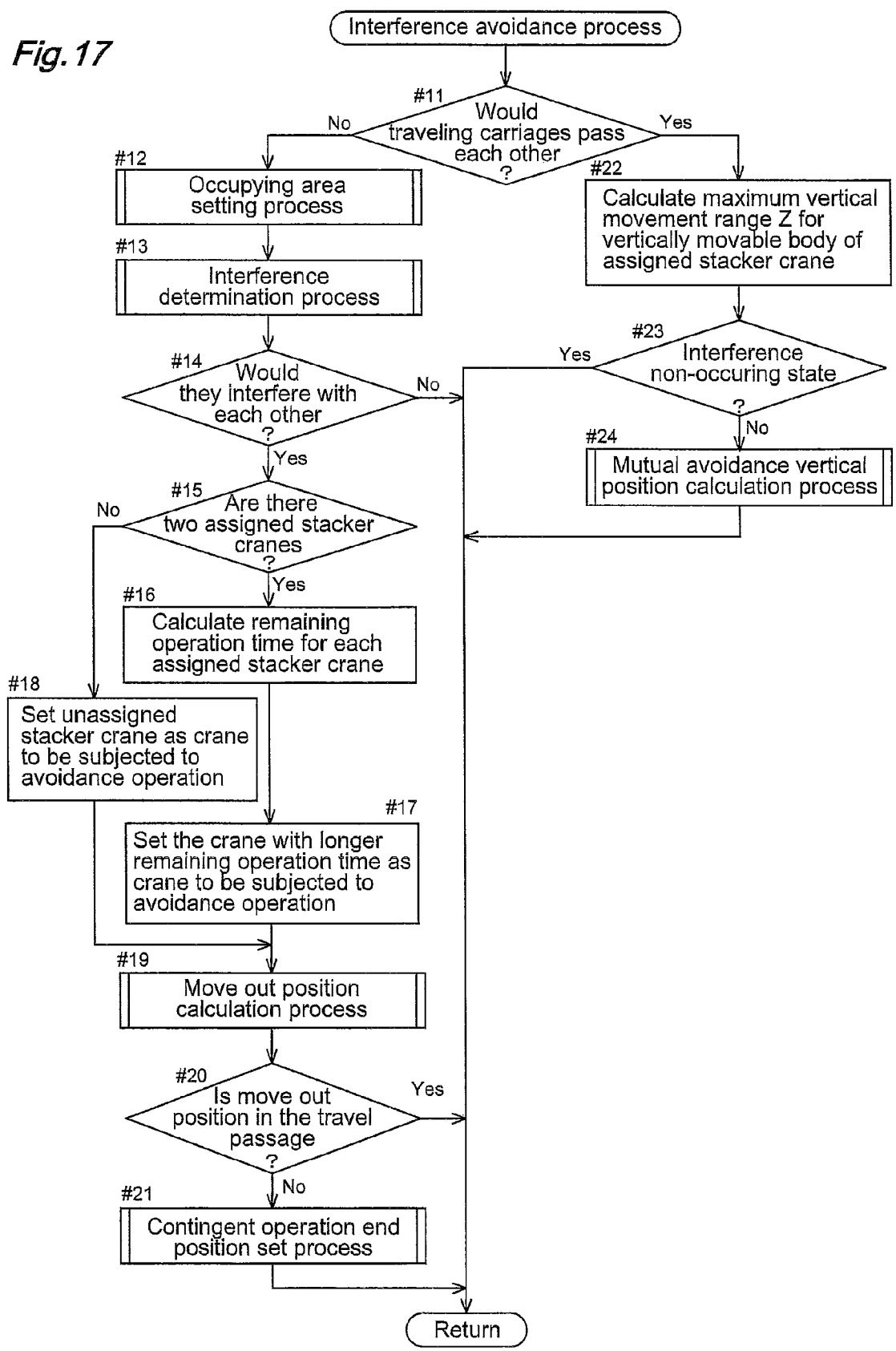
FIG. 17 is a flow chart for the interference avoidance process in accordance with an alternative embodiment.

In FIG. 17, if it is not determined that the interference non-occurring state exists at #23, the control proceeds to #24, and the interference avoidance control means 33 executes the mutual avoidance vertical position calculation process to generate the avoidance vertical position information for each vertically movable body UD for raising or lowering both of the vertically movable bodies UD in the vertical movement operation for the avoidance operation.

In the mutual avoidance vertical position calculation process, both of the pair of vertically movable bodies UD are raised and lowered by the vertical movement operation for avoiding interference, which is different from a vertical movement operation for an article transporting operation, to raise or lower the vertically movable body UD of the No. 1 crane 3a and the vertically movable body UD of the No. 2 crane 3b to the vertical positions for passing each other which are separated form each other in the vertical direction by a distance greater than or equal to the required separating distance y_CL which is defined to be a separating distance that allows the pair of stacker cranes 3 to pass each other without interfering with each other. The ground side controller H is configured to perform the mutual avoidance vertical movement process in this manner.

Figure 18:
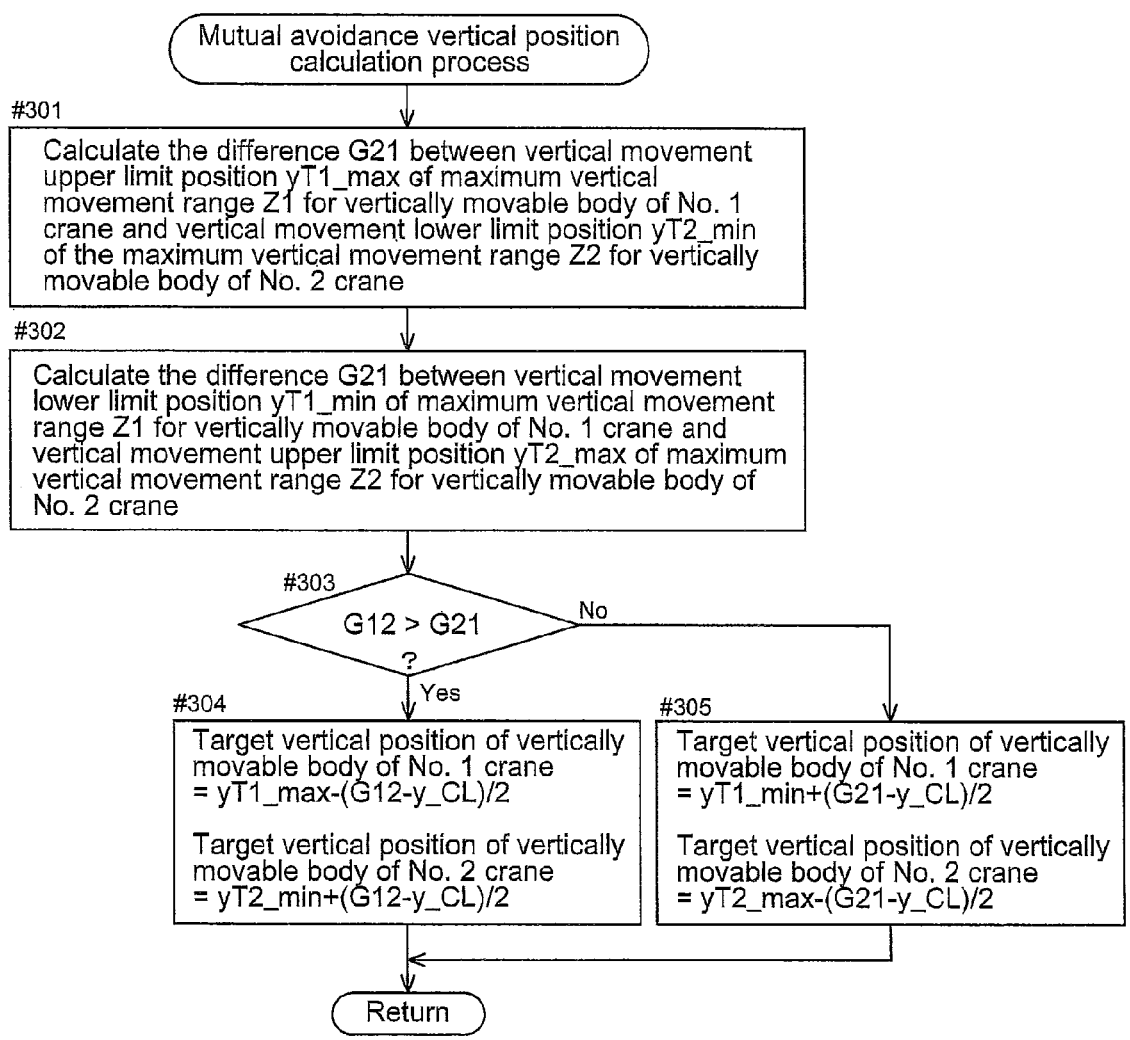
FIG. 18 is a flow chart for the mutual avoidance vertical position calculation process in accordance with an alternative embodiment.

The mutual avoidance vertical position calculation process is described next with reference to the flow chart in FIG. 18. The difference G12 between the vertical movement upper limit position yT1_max in the maximum vertical movement range Z1 for the vertically movable body UD of the No. 1 crane 3a and the vertical movement lower limit position yT2_min in the maximum vertical movement range Z2 for the vertically movable body UD of the No. 2 crane 3b is calculated at #301. The difference G21 between the vertical movement lower limit position yT1_min in the maximum vertical movement range Z1 about the vertically movable body UD of No. 1 crane 3a and the vertical movement upper limit position yT2_max in the maximum vertical movement range Z2 about the vertically movable body UD of No. 2 crane 3b is calculated at #302.

G12 and G21 are compared at #303, and respective target vertical positions for the No. 1 crane 3a and the No. 2 crane 3b are computed based on the greater of the vertical position differences at #304 and #305. That is, "Yes" is taken at #303 if G12 is larger than G21, and the control proceeds to #304 and, the target vertical position of the vertically movable body UD of the No. 1 crane 3a is set to yT1_max−(G12−y_CL)/2, and the target vertical position of the vertically movable body UD of the No. 2 crane 3b is set to yT2_min+(G12−y_CL)/2. "No" is taken at #303 if G21 is greater than G12, and the control proceeds to #305, and the target vertical position of the vertically movable body UD of the No. 1 crane 3a is set to yT1_min+(G21−y_CL)/2, and the target vertical position of the vertically movable body UD of the No. 2 crane 3b is set to yT2_max−(G21−y_CL)/2. Once the interference avoidance control means 33 sets the target vertical position for each of the vertically movable bodies UD of the No. 1 crane 3a and No. 2 crane 3b to be the values for the avoidance operation, it ends the mutual avoidance vertical position calculation process, and also the interference avoidance process, after which the control of the ground side controller H returns to the main routine in FIG. 6.

By setting the target vertical position for the vertically movable body UD of the No. 1 crane 3a, and the target vertical position for the vertically movable body UD of the No. 2 crane 3b in the mutual avoidance vertical position calculation process, the vertical movement operations for the pair of vertically movable bodies UD are controlled such as to secure the required separating distance y_CL by the vertical movement operations of both of the No. 1 crane 3a and the No. 2 crane 3b. Therefore, because the amount of vertical movement operations for avoiding interference, that each of the vertically movable bodies UD of No. 1 crane 3a and No. 2 crane 3b needs to cover, is evenly distributed between the two, the amount by which the No. 1 crane 3a and No. 2 crane 3b deviate from the planned trajectories based on pure article transporting operations is minimized, and, the vertically movable bodies UD can be raised or lowered the vertical positions for passing which are separated from each other by the required separating distance in the vertical movement direction as soon after the travel position of each of the traveling carriages 9 of the No. 1 crane 3a and No. 2 crane 3b reaches the mutually proximate position as possible.

Figure 19:
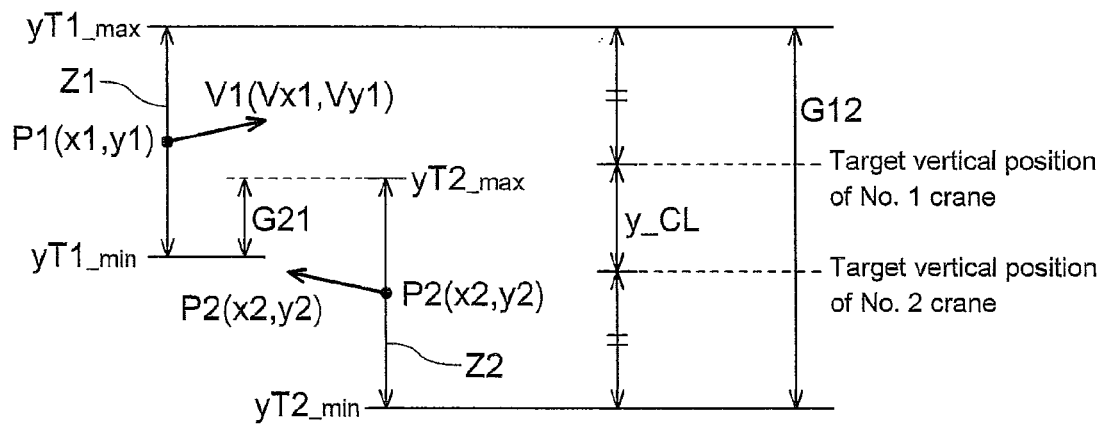
FIG. 19 is a drawing for explaining an example of a setting of the target vertical position by the mutual avoidance vertical position calculation process in accordance with an alternative embodiment.

For example, as shown in FIG. 19, if both of the No. 1 crane 3a and No. 2 crane 3b are performing article transporting operations as assigned cranes, and if the No. 1 crane 3a is operating at the position P1 (x1, y1) with speed V1 (Vx1, Vy1) and No. 2 crane 3b is operating at the position P2 (x2, y2) with speed V2 (Vx2, Vy2) at the current control timing, and if the difference G12 between the vertical movement upper limit position yT1_max which is the upper end of the maximum vertical movement range Z1 of the vertically movable body UD of the No. 1 crane 3a and the vertical movement lower limit position yT2_min which is the lower end of the maximum vertical movement range Z2 of the vertically movable body UD of the No. 2 crane 3b is greater than the difference G21 between the vertical movement lower limit position yT1_min which is the lower end of the maximum vertical movement range Z1 of the vertically movable body UD of the No. 1 crane 3a and the vertical movement upper limit position yT2_max which is the upper end of the maximum vertical movement range Z2 of the vertically movable body UD of the No. 2 crane 3b, then the value obtained by subtracting the required separating distance y_CL from the difference G12 between the vertical positions is divided by 2 and the position lower by the divided value than the vertical movement upper limit position yT1_max which is the upper end of the maximum vertical movement range Z1 of the No. 1 crane 3a is set to be the target vertical position for the vertically movable body UD of the No. 1 crane 3a, and the position higher by the divided value than the vertical movement lower limit position yT2_min which is the lower end of the maximum vertical movement range Z2 of No. 2 crane 3b is set to be the target vertical position for the vertically movable body UD of No. 2 crane 3b.

Accordingly, because the ground side controller H updates and sets the target vertical position information for each vertically movable body UD in accordance with or based on the operational state (position and operation speed) of the stacker crane 3 at that time at every control timing, both of the vertically movable bodies UD can be raised or lowered accurately to the vertical positions for passing each other, minimizing the unnecessary vertical movements.

Figure 20:
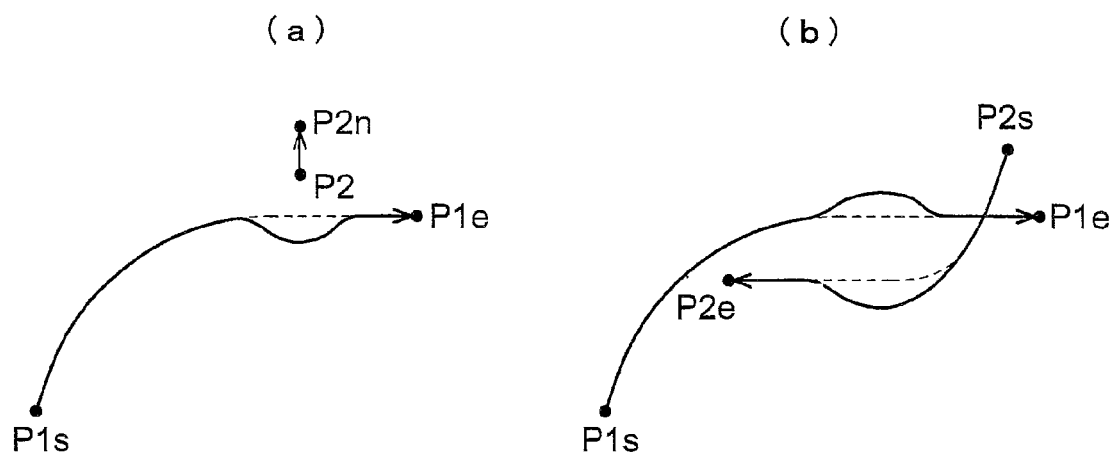
FIG. 20 is a line diagram showing the movements of the stacker cranes in an interference avoidance process when the cranes pass each other in accordance with an alternative embodiment.

For example, as shown in FIG. 20(a), if only the No. 1 crane 3a is performing the article transporting operation as an assigned crane from the operation starting position P1s to the operation end position P1e, and if the No. 2 crane 3b is stopped in the standby state as an unassigned crane, the vertically movable bodies UD of the No. 1 crane 3a and No. 2 crane 3b perform the vertical movement operations for the avoidance operation to the vertical positions for passing each other (P2n for No. 2 crane 3b), when the travel positions of the traveling carriage 9 of No. 1 crane 3a and No. 2 crane 3b reach the mutually proximate positions, to avoid any interference between No. 1 crane 3a and No. 2 crane 3b. The trajectory containing a portion shown with a dotted line in the drawing is one in which the No. 1 crane 3a performs only the vertical movement operation for an article transporting operation, and not the vertical movement operation for avoiding interference.

And as shown in FIG. 20(b), when both of the No. 1 crane 3a and No. 2 crane 3b are performing the article transporting operations as assigned cranes from the operation starting positions P1s, P2s to the operation end positions P1e, P2e, then both of the vertically movable bodies UD of the No. 1 crane 3a and No. 2 crane 3b perform vertical movement operations that are different from the vertical movement operation in an article transporting operation to move vertically to be located at the vertical positions for passing each other when the travel positions of the traveling carriages 9 of the No. 1 crane 3a and No. 2 crane 3b reach the mutually proximate positions to avoid any interference between the No. 1 crane 3a and No. 2 crane 3b. The trajectories containing a portion shown with a dotted line in the drawing are ones in which the No. 1 crane 3a and No. 2 crane 3b perform only the vertical movement operation for an article transporting operation, and not the vertical movement operation for avoiding interference.

Thus, when respective travel positions of the pair of traveling carriages 9 are at the mutually proximate positions, the ground side controller H is configured to perform the interference avoidance vertical movement process in which the vertical movement operations of the vertically movable bodies UD of the pair of stacker crane 3 are controlled based on the detected information from the first laser travel range finder 25, the second laser travel range finder 29, the first laser vertical range finder 23, and the second laser vertical range finder 27, to position the pair of vertically movable bodies UD at the non-interfering positions where the pair of stacker cranes 3 will not or would not interfere.

Alternative Embodiments (1) In the embodiment described above, the ground side controller H may decide whether an actual transporting operation or an empty transporting operation should be performed. And, in the interference avoidance process, different values for the required separating distance y_CL may be used depending on the types of the transporting operation classifications performed by the No. 1 crane 3a and No. 2 crane 3b (on whether the article is carried).

(2) In the embodiment described above, although only the interference avoidance process that controls the operation of only one of the No. 1 crane 3a and the No. 2 crane 3b was described, an interference avoidance process may control the operations of both of No. 1 crane 3a and No. 2 crane 3b.

(3) In order to determine whether a crane is at the mutually proximate position, vehicle distance detection means for detecting the distance between the traveling carriages of the pair of stacker crane may be provided to both or one of the pair of stacker cranes. And the control means may determine whether the cranes are at the mutually proximate positions based on the vehicle distance information detected by this vehicle distance detection means.

(4) In the embodiment described above while the control means is described to consist of the ground side controller H, the controller is not limited to this configuration. And the control means may consist of a managing controller installed on the ground which transmits the operation starting position information and operation end position information based on the operation command to the No. 1 crane 3a and No. 2 crane 3b, a first crane controller carried on the No. 1 crane 3a for controlling the operation of the No. 1 crane 3a based on the operation starting position information and operation end position information received from the managing controller, and a second crane controller 32 carried on the No. 2 crane 3b for controlling the operation of the No. 2 crane 3b based on the operation starting position information and operation end position information received from the managing controller. The specific configuration of the control means can be suitably changed.

(5) Although control means was described in the embodiment described above to be one which issued the target travel position information and the target vertical position information to control the operations of the pair of stacker cranes, the control means is not limited to this configuration. For example, the control means may issue target travel speed information and target vertical movement speed information to control the operations of the pair of stacker cranes. Thus, various information may be used as command information issued by the control means.

(6) The mutual avoidance vertical movement process is described to be performed when respective travel positions of the pair of traveling carriage are at the mutually proximate positions in the embodiment described above; however, for example, the mutual avoidance vertical movement process may be performed at the start of the article transporting operation so that the travel operations of the No. 1 crane 3a and No. 2 crane 3b are performed after the vertical positions of both of the pair of vertically movable bodies UD are located in advance at the vertical positions for passing each other, and such that the vertical movement operations for article transporting operations are started after the No. 1 crane 3a and No. 2 crane 3b have passed each other. Accordingly, the time for performing the mutual avoidance vertical movement process may be suitably changed.

INDUSTRIAL APPLICABILITY

The present invention is applicable to the article storage facility which utilizes stacker cranes.

DESCRIPTION OF THE REFERENCE NUMERALS AND SYMBOLS

UD Vertically Movable Body
H Control Means
βH Set Deceleration
VBW1, VBW2 Tentative Braking Range
P1m (x1m, y1m) Non-interfering Position
P2m (x2m, y2m) Non-interfering Position
P2n (x2, y2n) Vertical Positions for Passing Each Other, Non-interfering Position
y_CL Required Separating Distance
T Remaining Time
Z Maximum Vertical Movement Range
1 Article Storage Rack
2 Travel Path
3 Stacker Crane
4 Article
6 Storage Unit
7 Travel Guide Rail
9 Traveling Carriage
10 Vertical Movement Guiding Mast
11 Vertically Movable Platform
12 Article Transfer Device
23, 27 Vertical Position Detection Means
25, 29 Travel Position Detection Means
31 First Crane Control Means
32 Second Crane Control Means

The invention claimed is:

1. An article storage facility comprising:
an article storage rack having a plurality of storage units for storing articles, the storage units being arranged in a vertical direction and in a lateral direction;
a pair of stacker cranes configured to travel along a travel path provided on a front side of the article storage rack along a rack lateral width direction,
with each of the pair of stacker cranes having a traveling carriage, and a vertically movable body including a vertically movable platform configured to be guided for vertical movement by a vertical movement guiding mast provided to stand on the traveling carriage and an article transfer device provided to the vertically movable platform for transferring an article to and from the storage units;
a pair of travel position detection devices for detecting respective travel positions of the traveling carriages of the pair of stacker cranes;
a pair of vertical position detection devices for detecting respective vertical positions of the vertically movable bodies of the pair of stacker cranes;
a controller for controlling operations of the pair of stacker cranes based on detected information from the pair of travel position detection devices and the pair of vertical position detection devices;
a pair of travel guide rails which are spaced apart in a rack fore and aft direction representing a direction perpendicular to both the rack lateral width direction and the vertical direction and which are parallel with each other along the travel path, and
a stacker crane with its traveling carriage guided by one of the pair of travel guide rails and with a vertical movement guiding mast provided to the traveling carriage, and another stacker crane with its traveling carriage guided by the other of the pair of travel guide rails and with a vertical movement guiding mast provided to the traveling carriage are provided as the pair of stacker cranes,
wherein each of the pair of vertically movable bodies has a portion which overlaps with the vertically movable body of the other stacker crane in the rack fore and aft direction, and extends in the rack fore and aft direction from the vertical movement guiding mast without reaching the vertical movement guiding mast of the other stacker crane so that each of the pair of stacker cranes can pass each other,
wherein when an operation command for an article transport is issued to store an article to or to retrieve an article from the storage unit, the controller is configured, based on the operation command, to control an article transporting operation by an assigned stacker crane which is in charge of an article transport specified by the operation command, and to control each travel position of the pair of traveling carriages of the pair of stacker cranes based on the detected information from the pair of travel position detection devices, and to determine, at every set period, whether respective travel positions of the pair of traveling carriages are at mutually proximate positions for which the pair of stacker cranes are predicted to interfere with each other, while controlling the article transporting operation of the assigned stacker crane, and wherein, when respective travel positions of the pair of traveling carriages are at the mutually proximate positions, the controller is configured to perform an interference avoidance process in which operations of the pair of stacker cranes are controlled to position the pair of traveling carriages and the pair of vertically movable bodies at non-interfering positions where the pair of stacker cranes would not interfere with each other, based on the detected information from the pair of travel position detection devices and the pair of vertical position detection devices, and wherein the controller is configured to execute an interference avoidance vertical movement process, as the interference avoidance process, in which vertical movements of the pair of vertically movable bodies are controlled to raise or lower at least one of the pair of vertically movable bodies to bring the pair of vertically movable bodies to vertical positions for passing each other which are spaced apart in a vertical movement direction by a distance greater than or equal to a required separating distance which is defined as a separating distance which allows the pair of stacker cranes to pass each other without interfering with each other.

2. The article storage facility as defined in claim 1, wherein the controller is configured to determine that respective travel positions of the pair of traveling carriages are at the mutually proximate positions when there is an overlap between respective hypothetical braking ranges of respective traveling carriages, which range being a range covered by each traveling carriage from a current position until the time the traveling carriage stops, assuming that each of the pair of traveling carriages is stopped by decelerating at a set deceleration.

3. The article storage facility as defined in claim 1, wherein the controller is configured to perform the interference avoidance process by controlling an operation of only one of the pair of stacker cranes.

4. The article storage facility as defined in claim 3, wherein the controller is configured to perform the interference avoidance process by controlling an operation of an unassigned stacker crane which is not performing the article transporting operation between the pair of stacker cranes when the controller is causing only one of the pair of stacker cranes to perform the article transporting operation as an assigned stacker crane.

5. The article storage facility as defined in claim 3, wherein the controller is configured to perform the interference avoidance process by controlling an operation of an assigned stacker crane with a longer remaining operation time for the article transporting operation between the pair of stacker cranes when the controller is causing both of the pair of stacker cranes to individually perform the article transporting operation as assigned stacker cranes.

6. The article storage facility as defined in claim 1, wherein the controller is configured to derive, in the interference avoidance vertical movement process, a maximum vertical movement range, for the vertically movable body of the assigned stacker crane, which is a vertical movement range in which the vertically movable body can be raised or lowered by the article transporting operation in a remaining time from the time respective travel positions of the pair of traveling carriages reach the mutually proximate positions until assumed interference travel positions at which the pair of vertically movable bodies interfere with each other are reached when the traveling carriages are caused to travel and decelerate at a set deceleration, is configured to determine that an interference non-occurring state exists in which the pair of stacker cranes would not interfere with each other if the respective maximum vertical movement ranges for the pair of vertically movable bodies do not overlap because the ranges are separated from each other by a distance greater than the required separating distance when both of the pair of stacker cranes are caused to perform an article transporting operation as assigned stacker cranes, and is configured to determine that an interference non-occurring state exists if an interference range which extends in both vertical directions along the vertical movement direction about a vertical position of the vertically movable body of the other stacker crane by the required separating distance does not overlap with the maximum vertical movement range for the vertically movable body of the assigned stacker crane when only one of the pair of stacker cranes is caused to perform an article transporting operation as an assigned stacker crane, and wherein the controller is further configured to control vertical movement operations of the pair of vertically movable bodies, on one hand, to perform the article transporting operation in which vertical movement operations of the pair of vertically movable bodies are not controlled using the interference avoidance vertical movement process if it is determined that the interference non-occurring state exists in the interference avoidance vertical movement process, and, on the other hand, to perform the article transporting operation by controlling the pair of vertically movable bodies using the interference avoidance vertical movement process if it is determined that the interference non-occurring state does not exist in the interference avoidance vertical movement process.

7. The article storage facility as defined in claim 1, wherein the controller is configured to control each travel position of the pair of traveling carriages of the pair of stacker cranes and each vertical position of the pair of vertically movable bodies of the pair of stacker cranes based on the detected information from the pair of travel position detection devices and the pair of vertical position detection devices when controlling the article transporting operations of the pair of stacker cranes, and is configured to perform, as the interference avoidance vertical movement process, a mutual avoidance vertical movement process in which both of the pair of vertically movable bodies are raised or lowered by a vertical movement operation for avoiding interference which is different from a vertical movement operation in the article transporting operation to raise or lower the pair of vertically movable bodies to vertical positions for passing each other which are spaced apart in a vertical movement direction by a distance greater than or equal to a required separating distance which is defined as a separating distance which allows the pair of stacker cranes to pass each other without interfering with each other.

8. The article storage facility as defined in claim 7, wherein the controller is configured to determine that respective travel positions of the pair of traveling carriages are at the mutually proximate positions when there is an overlap in the direction of the travel path between respective hypothetical braking ranges of respective traveling carriages, which range being a range covered by each traveling carriage from a current position until the time the traveling carriage stops, assuming that each of the pair of traveling carriages is stopped by decelerating at a set deceleration.

9. The article storage facility as defined in claim 7, wherein the controller is configured to derive, in the mutual avoidance vertical movement process, a maximum vertical movement range, for the vertically movable body of the assigned stacker crane, which is a vertical movement range in which the vertically movable body can be raised or lowered by the article transporting operation in a remaining time from the time respective travel positions of the pair of traveling carriages reach the mutually proximate positions until assumed interference travel positions at which the pair of vertically movable bodies interfere with each other are reached when the traveling carriages are caused to travel and decelerate at a set deceleration, is configured to determine that an interference non-occurring state exists in which the pair of stacker cranes would not interfere with each other if the respective maximum vertical movement ranges for the pair of vertically movable bodies do not overlap because the ranges are separated from each other by a distance greater than the required separating distance when both of the pair of stacker cranes are caused to perform an article transporting operation as assigned stacker cranes, is configured to determine that an interference non-occurring state exists if an interference range which extends in both vertical directions along a vertical movement direction about a vertical position of the vertically movable body of the other stacker crane by the required separating distance does not overlap with the maximum vertical movement range for the vertically movable body of the assigned stacker crane when only one of the pair of stacker cranes is caused to perform an article transporting operation as an assigned stacker crane, and
wherein the controller is configured to control vertical movement operations of both of the pair of vertically movable bodies, on one hand, to perform the article transporting operation in which vertical movement operations of the pair of vertically movable bodies are not controlled using the mutual avoidance vertical movement process if it is determined that the interference non-occurring state exists in the mutual avoidance vertical movement process, and, on the other hand, to perform the article transporting operation by controlling the pair of vertically movable bodies using the mutual avoidance vertical movement process if it is determined that the interference non-occurring state does not exist in the mutual avoidance vertical movement process.

10. The article storage facility as defined in claim 7, wherein the controller is configured to control the article transporting operation for the assigned stacker crane by issuing, at every set control period, a target travel position for the traveling carriage and a target vertical position for the vertically movable body which are updated at every set control period based on a travel pattern for the article transporting operation and a vertical movement pattern for the article transporting operation which are generated in association with the operation command, and is configured, as the mutual avoidance vertical movement process, to control vertical movement operations of both of the pair of vertically movable bodies to raise and lower the pair of vertically movable bodies to the vertical positions for passing each other by issuing for the assigned stacker crane, at every set control period, a target vertical position for avoiding interference which is updated based on vertical positions, vertical movement speeds, and the required separating distance for the vertically movable bodies of the pair of stacker cranes, in place of the target vertical position for the vertically movable body specified based on the vertical movement pattern for the article transporting operation.

11. The article storage facility as defined in claim 7, wherein the controller is installed on the ground side and is configured to include a first crane controller for controlling an operation of one stacker crane between the pair of stacker cranes, and a second crane controller for controlling an operation of the other stacker crane.

12. A method for operating an article storage facility having:
an article storage rack having a plurality of storage units for storing articles, the storage units being arranged in a vertical direction and in a lateral direction; and
a pair of stacker cranes configured to travel along a travel path provided on a front side of the article storage rack along a rack lateral width direction;
wherein each of the pair of stacker cranes has a traveling carriage, and a vertically movable body including a vertically movable platform configured to be guided for vertical movement by a vertical movement guiding mast provided to stand on the traveling carriage and an article transfer device provided to the vertically movable platform for transferring an article to and from the storage units;
a pair of travel position detection devices for detecting respective travel positions of the traveling carriages of the pair of stacker cranes;
a pair of vertical position detection devices for detecting respective vertical positions of the vertically movable bodies of the pair of stacker cranes;
a controller for controlling operations of the pair of stacker cranes based on detected information from the pair of travel position detection devices and the pair of vertical position detection devices;
a pair of travel guide rails which are spaced apart in a rack fore and aft direction representing a direction perpendicular to both the rack lateral width direction and the vertical direction and which are parallel with each other along the travel path, and
a stacker crane with its traveling carriage guided by one of the pair of travel guide rails and with a vertical movement guiding mast provided to the traveling carriage, and another stacker crane with its traveling carriage guided by the other of the pair of travel guide rails and with a vertical movement guiding mast provided to the traveling carriage are provided as the pair of stacker cranes,
wherein each of the pair of vertically movable bodies has a portion which overlaps with the vertically movable body of the other stacker crane in the rack fore and aft direction, and extends in the rack fore and aft direction from the vertical movement guiding mast without reaching the vertical movement guiding mast of the other stacker crane so that each of the pair of stacker cranes can pass each other,
the method comprising the steps of:
generating an operation command for an article transport to store an article to or to retrieve an article from the storage unit;
controlling an article transporting operation for an assigned stacker crane which is in charge of an article transport specified by the operation command, based on the operation command;
controlling each travel position of the pair of traveling carriages of the pair of stacker cranes based on the detected information from the pair of travel position detection devices, and determining, at every set period, whether respective travel positions of the pair of traveling carriages are at mutually proximate positions for which the pair of stacker cranes are predicted to interfere with each other, while controlling the article transporting operation of the assigned stacker crane; and performing, when respective travel positions of the pair of traveling carriages are at the mutually proximate positions, an interference avoidance process in which operations of the pair of stacker cranes are controlled to position the pair of traveling carriages and the pair of vertically movable bodies at non-interfering positions where the pair of stacker cranes would not interfere with each other, based on the detected information from the pair of travel position detection devices and the pair of vertical position detection devices, wherein the step of performing the interference avoidance process includes the step of executing an interference avoidance vertical movement process in which vertical movements of the pair of vertically movable bodies are controlled to raise or lower at least one of the pair of vertically movable bodies to bring the pair of vertically movable bodies to vertical positions for passing each other which are spaced apart in a vertical movement direction by a distance greater than or equal to a required separating distance which is defined as a separating distance which allows the pair of stacker cranes to pass each other without interfering with each other.

13. The method for operating an article storage facility as defined in claim 12, wherein the step of determining whether respective travel positions of the pair of traveling carriages are at the mutually proximate positions at every set period includes the step of determining that respective travel positions of the pair of traveling carriages are at the mutually proximate positions when there is an overlap between respective hypothetical braking ranges of respective traveling carriages, which range being a range covered by each traveling carriage from a current position until the time the traveling carriage stops, assuming that each of the pair of traveling carriages is stopped by decelerating at a set deceleration.

14. The method for operating an article storage facility as defined in claim 12, wherein the interference avoidance process is performed by controlling either one of the pair of stacker cranes in the step of performing the interference avoidance process.

15. The method for operating an article storage facility as defined in claim 14, wherein in the step of performing the interference avoidance process, the interference avoidance process is performed by controlling an operation of an unassigned stacker crane which is not performing the article transporting operation between the pair of stacker cranes when only one of the pair of stacker cranes is caused to perform the article transporting operation as an assigned stacker crane.

16. The method for operating an article storage facility as defined in claim 14, wherein in the step of performing the interference avoidance process, the interference avoidance process is performed by controlling an operation of an assigned stacker crane with a longer remaining operation time for the article transporting operation between the pair of stacker cranes when both of the pair of stacker cranes are caused to individually perform the article transporting operation as assigned stacker cranes.

17. The method for operating an article storage facility as defined in claim 12, wherein the step of performing the interference avoidance vertical movement process includes the steps of deriving a maximum vertical movement range, for the vertically movable body of the assigned stacker crane, which is a vertical movement range in which the vertically movable body can be raised or lowered by the article transporting operation in a remaining time from the time respective travel positions of the pair of traveling carriages reach the mutually proximate positions until assumed interference travel positions at which the pair of vertically movable bodies interfere with each other are reached when the traveling carriages are caused to travel and decelerate at a set deceleration, determining that an interference non-occurring state exists in which the pair of stacker cranes would not interfere with each other if the respective maximum vertical movement ranges for the pair of vertically movable bodies do not overlap because the ranges are separated from each other by a distance greater than the required separating distance when both of the pair of stacker cranes are caused to perform an article transporting operation as assigned stacker cranes, and determining that an interference non-occurring state exists if an interference range which extends in both vertical directions along the vertical movement direction about a vertical position of the vertically movable body of the other stacker crane by the required separating distance does not overlap with the maximum vertical movement range for the vertically movable body of the assigned stacker crane when only one of the pair of stacker cranes is caused to perform an article transporting operation as an assigned stacker crane, and wherein in the step of performing the interference avoidance vertical movement process, vertical movement operations of the pair of vertically movable bodies are controlled, on one hand, to perform the article transporting operation in which vertical movement operations of the pair of vertically movable bodies are not controlled using the interference avoidance vertical movement process if it is determined that the interference non-occurring state exists, and, on the other hand, to perform the article transporting operation by controlling the pair of vertically movable bodies using the interference avoidance vertical movement process if it is determined that the interference non-occurring state does not exist in the interference avoidance vertical movement process.

18. The method for operating an article storage facility as defined in claim 12, wherein the method for operating includes controlling each travel position of the pair of traveling carriages of the pair of stacker cranes and each vertical position of the pair of vertically movable bodies of the pair of stacker cranes based on the detected information from the pair of travel position detection devices and the pair of vertical position detection devices when controlling the article transporting operations of the pair of stacker cranes, and wherein the step of performing the interference avoidance vertical movement process includes performing a mutual avoidance vertical movement process in which both of the pair of vertically movable bodies are raised or lowered by a vertical movement operation for avoiding interference which is different from a vertical movement operation in the article transporting operation to raise or lower the pair of vertically movable bodies to vertical positions for passing each other which are spaced apart in a vertical movement direction by a distance greater than or equal to a required separating distance which is defined as a separating distance which allows the pair of stacker cranes to pass each other without interfering with each other.

19. The method for operating an article storage facility as defined in claim 18, wherein the step of determining whether respective travel positions of the pair of traveling carriages are at the mutually proximate positions at every set period includes the step of determining that respective travel positions of the pair of traveling carriages are at the mutually proximate positions when there is an overlap in the direction of the travel path between respective hypothetical braking ranges of respective traveling carriages, which range being a range covered by each traveling carriage from a current position until the time the traveling carriage stops, assuming that each of the pair of traveling carriages is stopped by decelerating at a set deceleration.

20. The method for operating an article storage facility as defined in claim 18, wherein the step of performing the mutual avoidance vertical movement process includes deriving a maximum vertical movement range, for the vertically movable body of the assigned stacker crane, which is a vertical movement range in which the vertically movable body can be raised or lowered by the article transporting operation in a remaining time from the time respective travel positions of the pair of traveling carriages reach the mutually proximate positions until assumed interference travel positions at which the pair of vertically movable bodies interfere with each other are reached when the traveling carriages are caused to travel and decelerate at a set deceleration, determining that an interference non-occurring state exists in which the pair of stacker cranes would not interfere with each other if the respective maximum vertical movement ranges for the pair of vertically movable bodies do not overlap because the ranges are separated from each other by a distance greater than the required separating distance when both of the pair of stacker cranes are caused to perform an article transporting operation as assigned stacker cranes, and determining that an interference non-occurring state exists if an interference range which extends in both vertical directions along the vertical movement direction about a vertical position of the vertically movable body of the other stacker crane by the required separating distance does not overlap with the maximum vertical movement range for the vertically movable body of the assigned stacker crane when only one of the pair of stacker cranes is caused to perform an article transporting operation as an assigned stacker crane, and wherein in the mutual avoidance vertical movement process, vertical movement operations of both of the pair of vertically movable bodies are controlled, on one hand, to perform the article transporting operation in which vertical movement operations of the pair of vertically movable bodies are not controlled using the mutual avoidance vertical movement process if it is determined that the interference non-occurring state exists, and, on the other hand, to perform the article transporting operation by controlling the pair of vertically movable bodies using the mutual avoidance vertical movement process if it is determined that the interference non-occurring state does not exist in the mutual avoidance vertical movement process.

21. The method for operating an article storage facility as defined in claim 18, wherein the step of controlling the article transporting operation for the assigned stacker crane includes the step of issuing, at every set control period, a target travel position for the traveling carriage and a target vertical position for the vertically movable body which are updated at every set control period based on a travel pattern for the article transporting operation and a vertical movement pattern for the article transporting operation which are generated in association with the operation command, and wherein the step of performing the mutual avoidance vertical movement process includes controlling vertical movement operations of both of the pair of vertically movable bodies to raise and lower the pair of vertically movable bodies to the vertical positions for passing each other by issuing for the assigned stacker crane, at every set control period, a target vertical position for avoiding interference which is updated based on vertical positions, vertical movement speeds, and the required separating distance for the vertically movable bodies of the pair of stacker cranes, in place of the target vertical position for the vertically movable body specified based on the vertical movement pattern for the article transporting operation.

* * * * *